US012569874B2

(12) United States Patent
Lee et al.

(10) Patent No.: US 12,569,874 B2
(45) Date of Patent: Mar. 10, 2026

(54) DISPENSING GUN WITH ONBOARD ACCESSORY TOOL STOWAGE SYSTEM

(71) Applicant: PATENT & INVESTMENT LLC, Hanover, MD (US)

(72) Inventors: Albert Lee, Clarksville, MD (US); Brian Glass, West Friendship, MD (US); Tyler Hippen, Crofton, MD (US); Huang Cheng Yeh, Taichung City (TW)

(73) Assignee: Patent & Investment LLC, Hanover, MD (US)

( * ) Notice: Subject to any disclaimer, the term of this patent is extended or adjusted under 35 U.S.C. 154(b) by 110 days.

(21) Appl. No.: 18/327,520

(22) Filed: Jun. 1, 2023

(65) Prior Publication Data

US 2024/0399411 A1 Dec. 5, 2024

(51) Int. Cl.
*B05C 17/01* (2006.01)

(52) U.S. Cl.
CPC ................................ *B05C 17/0123* (2013.01)

(58) Field of Classification Search
CPC .............. B65D 83/0033; B65D 83/765; B65D 83/7713; B05C 17/01; B05C 17/0143; B05C 17/0052; B05C 17/0123
USPC ................................ 222/326, 327, 391, 386
See application file for complete search history.

(56) References Cited

U.S. PATENT DOCUMENTS 4,135,644 A * 1/1979 Pacetti ................ B05C 17/0143 222/326
4,213,546 A 7/1980 Massey
4,827,557 A 5/1989 Siler, Jr. et al.
4,932,294 A 6/1990 Chang
5,065,977 A 11/1991 Desjardin
5,413,258 A 5/1995 Kartler
5,815,925 A * 10/1998 Chang ..................... B05C 17/01 222/326
6,067,683 A * 5/2000 Reeves ................... B05C 21/00 15/236.01
6,325,261 B1 * 12/2001 Webber ................... B05C 17/01 224/904
7,127,769 B2 10/2006 Chang et al.
7,823,753 B2 * 11/2010 Kovac ................ B65D 83/0072 222/391
8,424,726 B2 4/2013 Mcclurg
8,857,673 B2 10/2014 Szpak et al.
8,904,910 B2 12/2014 Marsden et al.
(Continued)

*Primary Examiner* — Charles P. Cheyney
(74) *Attorney, Agent, or Firm* — Rosenberg, Klein & Lee

(57) ABSTRACT

A dispensing gun with an onboard tool stowage system is provided and has a frame body that includes a handle housing and a cartridge frame portion extending from said handle housing. The cartridge frame portion is configured for receiving a cartridge of work material therein. The frame body further includes at least one retention structure that has at least one receiving post protruding from said frame body. The dispensing gun further includes at least one accessory tool configured for detachable coupling with said at least one receiving post when stowed thereon, and a drive mechanism that is operably coupled to said frame body. The drive mechanism includes a drive member which passes displaceably into the cartridge frame portion responsive to operation of a trigger operatively disposed in the handle housing.

33 Claims, 15 Drawing Sheets

(56) References Cited

U.S. PATENT DOCUMENTS

| | | | | |
|---|---|---|---|---|
| 9,027,796 | B1 * | 5/2015 | Leitch | B05C 17/0052 15/118 |
| 10,722,916 | B2 * | 7/2020 | Demeris, Jr. | E04F 21/00 |
| 10,960,431 | B1 | 3/2021 | Elam | |
| 11,351,569 | B1 * | 6/2022 | Lee | B05C 17/00576 |
| 11,826,774 | B2 * | 11/2023 | Hong | B05C 17/0143 |
| 2004/0144804 | A1 * | 7/2004 | Borisch | B65H 35/06 222/148 |
| 2005/0023301 | A1 | 2/2005 | Rumrill et al. | |
| 2006/0283891 | A1 * | 12/2006 | Kovac | B05C 17/01 222/327 |
| 2013/0134182 | A1 * | 5/2013 | Brosche | B05C 17/0052 15/236.01 |
| 2013/0161360 | A1 * | 6/2013 | Marsden | B05C 17/0143 222/391 |
| 2016/0074282 | A1 | 3/2016 | Wong et al. | |
| 2020/0206774 | A1 | 7/2020 | Acosta | |

* cited by examiner

DISPENSING GUN WITH ONBOARD ACCESSORY TOOL STOWAGE SYSTEM

BACKGROUND OF THE INVENTION

The present invention is directed to dispensing guns used to dispense and apply an extrudable work material to various work surfaces and areas, which dispensing guns have incorporated thereon an accessory tool stowage system. More specifically, the present invention is directed to mounting structures configured to provide onboard stowage of certain accessory tools which are of particular utility for use during the process of applying the extrudable work material. As such, the stowage system preserves optimal efficacy of work material application, by providing nonobtrusive availability of certain much-used scraping, spreading, finishing, or other such accessory work tools removably stowed on a dispensing gun for use during the process of applying the work material.

Various dispensing guns for dispensing sealant, adhesive, epoxy, caulk, and other such viscous work materials are known in the art. They include handheld gun-type devices in which a cartridge containing a work material is loaded for engagement by the device's drive mechanism. Such drive mechanisms, when actuated, force the extrusive flow of the viscous work material out from the loaded cartridge and onto a particular work surface or area. In applications involving repair or renewal of the work surface or area where a sealant or caulk had previously been applied, the old sealant or caulk is usually first removed before the application of the new sealant or caulk. Typically, the removal of the old sealant or caulk is carried out with the use of scraper type hand tools. Then, after a bead of new sealant or caulk is dispensed onto the work surface or area, finishing hand tools are used to force the applied sealant or caulk into cracks and/or crevices and then for shaping the exposed surface of the sealant or caulk to provide a desired appearance. In first time applications of the sealant or caulk, finishing tools are utilized to force the applied sealant or caulk into cracks and/or crevices and for shaping the exposed surface of the sealant or caulk. In general, these preparatory, application and finishing operations require the use of more than one hand tool in addition to the dispensing gun applicator being used to dispense the sealant or caulk. Having such hand tools readily available to the users of the gun-type applicator devices is both convenient for the user and makes the application of sealant, caulk and other like work materials more efficient.

Hence, there is a need for a stowage system for these gun-type applicator devices that provides availability of certain well-used accessory tools right there on the dispensing gun for on-demand access by users without having to set the dispensing gun down and retrieve the accessory tools for use immediately preceding, and during the work material application process.

SUMMARY OF THE INVENTION

A dispensing gun with an onboard accessory tool stowage system is provided. The dispensing gun has a frame body that includes a handle housing and a cartridge frame portion. The cartridge frame portion extends from the handle housing and is configured for receiving a cartridge of work material therein. The frame body further includes at least one retention structure. The at least one retention structure has at least one receiving post protruding from the frame body. The dispensing gun further has at least one accessory tool that is configured for releasable engagement with the at least one receiving post when stowed thereon. The dispensing gun also has a drive mechanism operably coupled to the frame body. The drive mechanism includes a drive member passing displaceably into the cartridge frame portion for forcing extrusion of work material from a cartridge of work material disposed in the cartridge frame portion.

Additionally, the at least one receiving post is formed in the frame body in one-piece formation, or alternately, the at least one retention structure may be formed by a base having an outer facing surface from which the at least one receiving post extends outwardly. The base may include a plurality of fastening tangs extending from an opposing surface thereof for passage through at least one aperture formed in the frame body for retentive engagement with a corresponding surface of the frame body.

From another aspect, a dispensing gun with an onboard accessory tool stowage system including a frame body having a handle housing and a cartridge frame portion is provided. The cartridge frame portion extends from the handle housing and is configured for receiving a cartridge of work material therein. The frame body further includes a plurality of retention structures. Each of the retention structures has at least one receiving post protruding from the frame body. The dispensing gun further includes a plurality of accessory tools. Each of the plurality of accessory tools is configured for detachable engagement with the at least one receiving post of a respective one of the plurality of retention structures when stowed thereon. Additionally, the dispensing gun includes a drive mechanism operably coupled to the frame body. The drive mechanism includes a drive member passing displaceably into the cartridge frame portion for forcing extrusion of work material from a cartridge of work material disposed in the cartridge frame portion.

Further, the plurality of retention structures each includes a base having an outer facing surface from which the at least one receiving post extends outwardly. The base is configured for retentive engagement with the frame body. The retentive engagement may be by discrete fasteners or by a plurality of fastening tangs extending from a surface of the base opposite to the outer facing surface, for passage through at least one aperture formed in the frame body.

From yet another aspect, a dispensing gun with an onboard tool stowage system is provided. The dispensing gun includes a frame body having a handle housing and a cartridge frame portion. The cartridge frame portion extends from the handle housing and is configured for receiving a cartridge of work material therein. The frame body further includes at least one retention structure, and the at least one retention structure includes at least one receiving post protruding from the frame body. The dispensing gun additionally includes at least one accessory tool configured for detachable coupling with the at least one receiving post when stowed thereon. Still further, the dispensing gun includes a drive mechanism operably coupled to the frame body. The drive mechanism includes a drive member that passes displaceably into the cartridge frame portion for forcing extrusion of work material from a cartridge of work material disposed in the cartridge frame portion.

BRIEF DESCRIPTION OF THE DRA WINGS

DETAILED DESCRIPTION OF THE PREFERRED EMBODIMENTS

Figure 1:
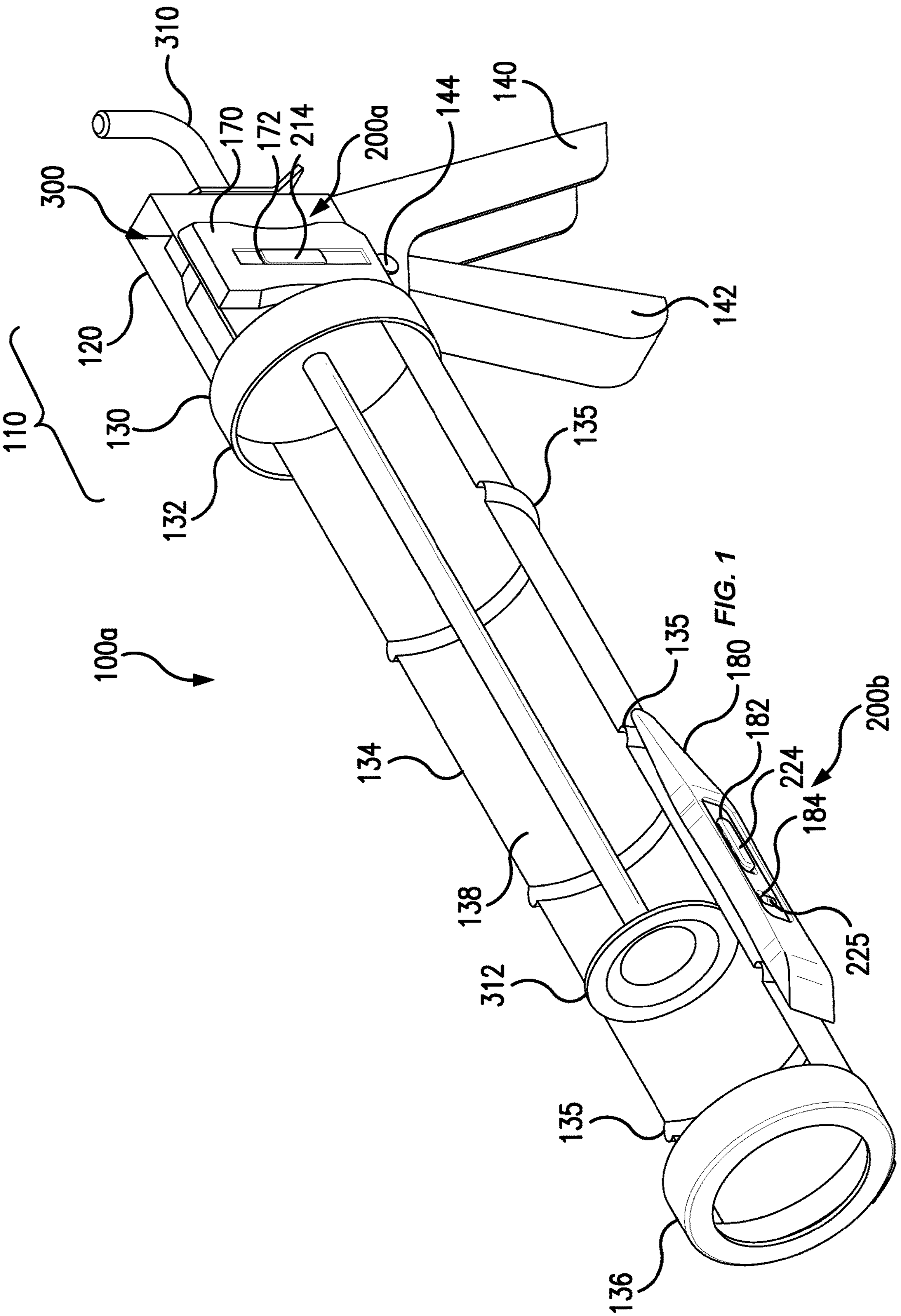
FIG. 1 is a left side perspective view of an exemplary dispensing gun with an onboard accessory tool stowage system of the present invention.

Referring now to FIGS. 1-19, there is illustratively shown a dispensing gun 100*a*, 100*b*, 100*c*, 100*d* equipped with an onboard accessory tool stowage system 200*a*, 200*b*, 200*c*. The dispensing gun 100*a*, 100*b*, 100*c*, 100*d* includes a frame body 110 and the accessory tool stowage system 200*a*, 200*b*, 200*c* is coupled to the frame body 110. The accessory tool stowage system 200*a*, 200*b*, 200*c* firmly maintains at least one hand tool 170, 180 coupled to the frame body 110 until such time that a user chooses to make use of the accessory tool 170, 180, and at which time the accessory tool 170, 180 is easily separated from the dispensing gun 100*a*, 100*b*, 100*c*, 100*d* for such use. Although two exemplary accessory tools are described herein, it should be understood that tools of other configurations and/or functions, as well as the number of tools stowed on any particular dispensing gun, should not be interpreted as limiting the scope of the disclosure presented herein.

The inventive concepts disclosed herein are directed to stowage of accessory tool and stowage refers to the process of arranging and securing those tools on a dispensing gun 100*a*, 100*b*, 100*c*, 100*d*. Stowage of the accessory tools involves optimizing the use of space and ensuring that the accessory tools are unobtrusively secured during transport and use of the dispensing gun 100*a*, 100*b*, 100*c*, 100*d*. To accommodate the releasable retention of one or more of the accessory tools 170, 180, the tool stowage system 200*a*, 200*b*, 200*c* provides at least one post 214, 214*a*, 214*b*, 224 that extends outwardly from the frame body 110. Briefly, the applicator system 10 is configured such that it may be loaded securely with one or more cartridges (not shown) containing a particular work material, of any suitable type known in the art. Once loaded, the dispensing gun 100*a*, 100*b*, 100*c*, 100*d* may be actuated to force extruded dispensing of the work material from the cartridge onto a work surface (or area). The dispensing gun 100*a*, 100*b*, 100*c*, 100*d* is generally constructed to minimize overall weight and bulk, while preserving the structural properties required for maximum transfer of energy to drive such extruded dispensing of the work material. The dispensing gun 100*a*, 100*b*, 100*c*, 100*d* is suitably constructed to maintain stable support and secure retention of the cartridge loaded therein during operation.

As will be discussed in following paragraphs, the post 214, 214*a* 214*b* is respectively received within a receptacle 172, 172*a* of a finishing tool 170. Finishing tool 170 is designed to be used to displace work material applied by the dispensing gun 100*a*, 100*b*, 100*c*, 100*d* into cracks, crevices and seams of a given work area and shape the bead of applied work material to provide a desired appearance, which may be a bevel of a certain angle, a concave fillet, or the like. To accomplish this task the finishing tool 170 may be formed of a wide range of materials having various degrees of flexibility or resilience. As such, where the finishing tool is formed of a flexible material such as silicone, natural rubber or artificial rubber materials, and the like, the engagement between the receptacle 172, 172*a* thereof and the post 214, 214*a*, 214*b* can be a frictional engagement. When the finishing tool is formed of less resilient materials, the post 214 may also be formed with retention protuberances to provide a snap-fit engagement with the receptacle 172, 172*a* of the accessory tool 170. The accessory tool 180, a scraper/smoothing tool, is also frequently used when viscous type work materials are applied to a work area by means of a dispensing gun. A scraping tool is most often used to remove old caulk or sealant from the work area in preparation for the application of new caulk or sealant, and a smoothing tool is used to work material applied by the dispensing gun into cracks, crevices, and seams of the work area. Accessory tool 180 has a scraper formed at one longitudinal end thereof and the opposing end is configured with a radiused and tapered contour to function as a smoothing tool. The scraping function of accessory tool 180 requires it to be formed of a less flexible material than that of accessory tool 170, and is often formed of a plastic composition that is harder and stiffer than that of the finishing tool 170. For that reason, in order to ensure a reliable releasable engagement of the posts 224 and 225 of the accessory tool stowage system 220*b* with the accessory tool 180, each of the posts 224 and 225 is formed with a respective retention protuberance 2242 and 2252, respectively, to provide a snap-fit type releasable engagement with the at least one receptacle 182*a*, or a pair of receptacles 182 and 184 of the scraper/smoothing accessory tool 180.

The accessory tool stowage systems 200*a*, 200*b* and 200*c* are configured and disposed to keep the accessory tools 170, 180, when stowed, well clear of the user's normal handling and manipulation of the dispensing gun 100*a*, 100*b*, 100*c*, 100*d* during typical use, while consistently maintaining a readily accessible yet firmly supported retention of the accessory tools 170, 180. As shown in the drawings, the receptacles 172 and 172*a* are each formed in the illustrated embodiments as a simple through opening. It is contemplated that in alternate embodiments, the receptacle 172, 172*a* may be formed otherwise, such as by a recess or other complementary structure for retentively mating with the post 214, 214*a*, 214*b*. The rectangular shape of the opening that defines the receptacle 172 or somewhat oval shape of the receptacle 172*a* and the corresponding receiving posts 214, 214*a*, 214*b* illustrate but a very few of numerous examples of shapes, and forms that these cooperatively engaging features may take on. It should be understood that the shape and number of posts and corresponding receptacles may altered from that which is specifically disclosed herein without departing from the inventive concepts set forth in this disclosure. Other shapes and number of posts may be chosen, so long as the cooperative engagement provides a secure hold during typical use of the dispensing gun 100*a*, 100*b*, 100*c*, 100*d* while being readily removable by a user simply drawing the accessory tool 170 up and off the post or posts. Likewise, the retention of the accessory tool 180 can be similarly modified without departing from the inventive concepts disclosed herein.

Generally, the handle housing 120 includes a handle, member 140 which extends as shown the appended drawings. The handle housing 120 also includes a trigger member 142 pivotally coupled to an upper part of the handle member 140 in some dispensing gun configurations, or pivotally coupled to the handle housing 120 in other dispensing gun configurations, for pivotal displacement thereabout, not important to the inventive concepts being disclosed herein and well known in the art. The handle housing 120 also serves as the housing for the hardware that implements the drive mechanism 300 of the dispensing gun. The mechanical assembly of elements that form the drive mechanism 300 and their coupling to the trigger member is likewise not important to the inventive concepts being disclosed herein and likewise well known in the art. The handle housing 120 is formed to define one or more compartments to house any suitable type and combination of drive mechanism hardware known in the art that may be utilized for a given dispensing gun 100*a*, 100*b*, 100*c*, 100*d*. Such drive mechanism hardware housed by the handle housing 120 (not shown) may include, for example, a ratcheting or other suitable mechanism known in the art for retractably advancing the drive member 310 into the cartridge loading compartment defined by the cartridge frame 130.

Referring now specifically to FIG. 1, the dispensing gun 100*a* is shown having accessory stowage system 200*a* and 200*b*. Dispensing gun 100*a* includes a frame body 110 which is formed by a handle housing 120 and a cartridge frame 130 coupled to the handle housing 120 and extends longitudinally therefrom. The handle housing 120 includes a handle member 140 extending in a direction transversely with respect to the longitudinal direction, as is conventional. The handle housing also includes a trigger member 142 that is pivotally connected to the handle member 140 and operatively coupled to a drive mechanism 300 of the dispensing gun 100*a*. Responsive to displacement of the trigger member 142 toward the handle member 140, the drive mechanism 300 is operated to displace the drive member 310 longitudinally, displacing the plunger disc 312 toward the front support member 136 within the cartridge receiving space 138. Thus, when a cartridge containing the work material is disposed in the cartridge receiving space 138, the advancement of the drive member 310 toward the front support member 136 displaces the plunger disc 312 and with it, a piston disc within the cartridge (not shown) to displace the work material through a nozzle of the cartridge that have been opened for dispensing of the work material. It should be noted that while the front support member 136 is illustrated herein as being a closed annulus, such may be formed with an open portion thereof. In any of dispensing guns 100*a*, 100*b*, 100*c* and 100*d*, as a passageway for the nozzle portion of the work material cartage to pass therethrough during insertion of the cartridge into the cartridge receiving space 138 may be formed through a portion of the front support member 136.

For any of dispensing guns 100*a*, 100*b*, 100*c* and 100*d*, drive mechanism 300 may be of any suitable type known in the art. As such, the type of coupling between drive mechanism 300 and the drive member 310 may employ any suitable type of coupling mechanism. For example, a ratcheting type mechanism may operate on the drive member 310 that passes displaceably through the handle housing 120. The drive mechanism 300 in the embodiment shown is configured to operate responsive to displacement of the trigger 142 toward the handle member 140, with the trigger member 142 being coupled by a pivot member 144 to an upper portion of the handle member 140 or alternately in some dispensing gun configurations, to another portion of the handle housing 120. The trigger member 142 may be biased by a spring or other resilient member (not shown) to be displaced outward from the handle member 140 subsequent to having been squeezed toward the handle member 140 for a pull stroke.

The trigger member 142 is returned by the spring for displacement in another pull stroke. With each pull stroke, the ratcheting drive mechanism incrementally advances then holds the drive member 310, and the plunger disc 312 therewith, further into the cartridge receiving space 138, against the piston disc of the cartridge loaded there. While the drive mechanism 300 is suitably housed within the handle housing 120, as described herein, the present invention is not limited to any particular choice of drive mechanism type, nor to any particular choice of structure and configuration for that drive mechanism 300. As such mechanisms are well known in the art, the drive mechanism 300 is not described in any further detail.

The cartridge frame 130 in the dispensing gun 100*a* includes a cartridge frame member 134 that extends longitudinally from the rear support member 132 to the front support member 136. The rear support member 132 is mechanically coupled to the handle housing 120. The cartridge frame member 134 of dispensing gun 100*a* has a semicylindrical contour to form a cradle that serves to support a cartridge of work material disposed in the cartridge receiving space 138. The cartridge frame member 134 may be formed with a plurality of stiffening ribs 135, arranged in longitudinally spaced relationship, one with respect to another, and protruding on an outwardly facing side of the cartridge frame member 134.

While dispensing gun 100*a* is shown as including two accessory tool stowage systems, the accessory tool stowage system 200*a* and the accessory tool stowage system 200*b*, such is intended to be exemplary. A single one of accessory tool stowage system 200*a* or 200*b* may be included as part of the frame body 110 and in any unobtrusive location thereon. Further, multiple accessory tool stowage systems may likewise be included as part of frame body 110, with the only limit being the available mounting space. In the particular example shown in FIG. 1, the accessory tool stowage system 200*a* includes a post 210 to which the receptacle 172 of accessory finishing tool 170 is releasably engaged. Since the longitudinal extent of the handle housing of dispensing gun 100*a* is not very large, to accommodate the stowage of the accessory finishing tool 170, the post 214 and thereby the accessory tool 170 are oriented in a transverse direction with respect to longitudinal direction of the frame body 110. As will be seen with other of the exemplary dispensing guns, the orientation of the post 214 can be arranged in other directions than as shown in FIG. 1. In fact, the post 214 can be oriented in any selected direction to orient and locate the stowage of accessory tool 170 unobtrusively. Similarly, the accessory tool stowage system 200*b* includes a post 224 protruding from cartridge frame portion of the frame body 110, to which the receptacle 182 of the accessory scraper/smoothing tool 180 is releasably engaged. As the accessory scraper/smoothing tool 180 has a fairly large longitudinal extent, accessory tool stowage system 200*b* includes a second post 225 protruding outwardly to aid in the releasable retention of the accessory scraper/smoothing tool 180 by releasable engagement with the second receptacle 184, thereby providing providing resistance to torsional displacement of accessory tool 180. The structure of each of the accessory tool stowage systems 200*a* and 200*b* will be further described in following paragraphs.

Figure 2:
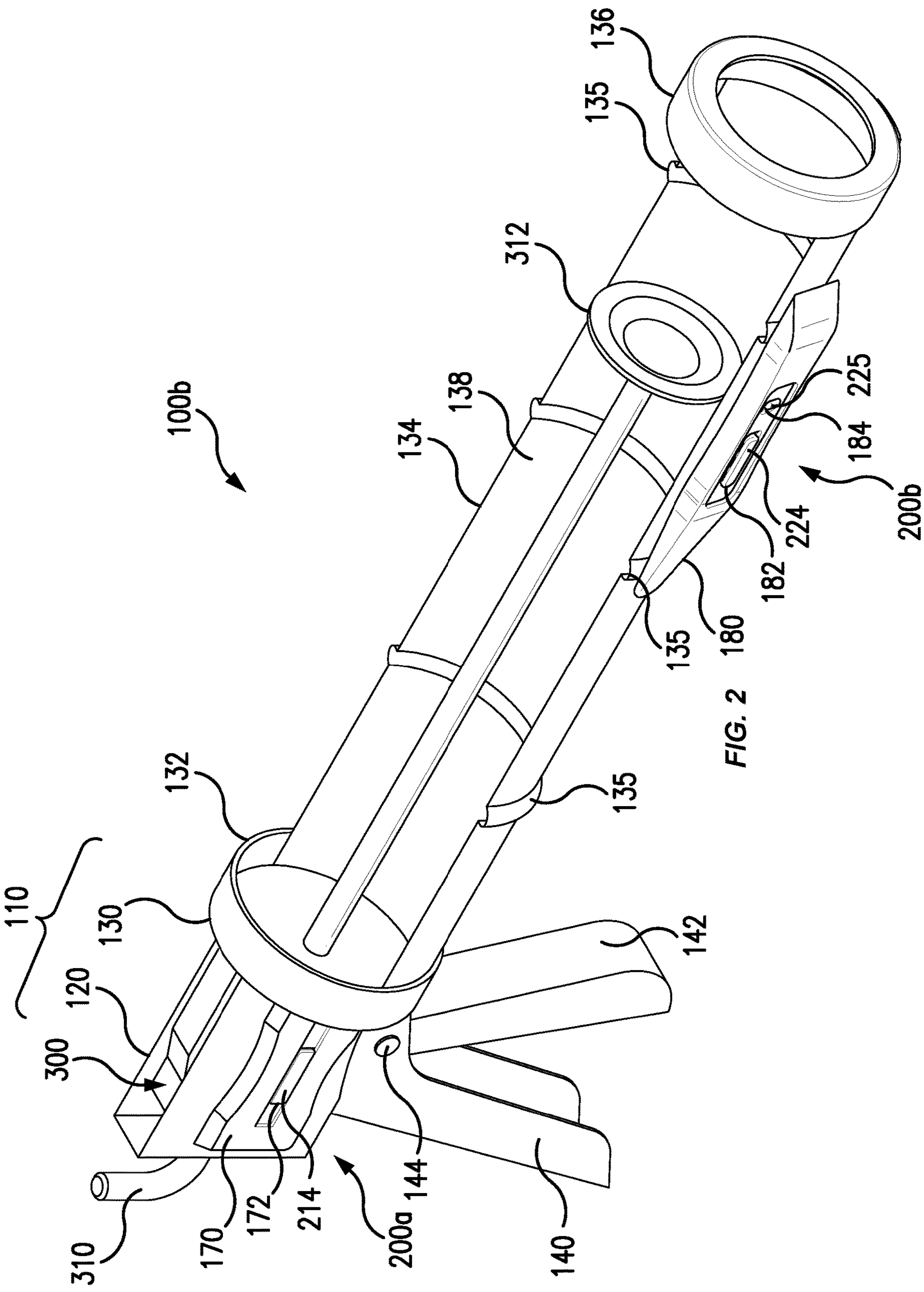
FIG. 2 is a right-side perspective view of another exemplary dispensing gun with an onboard accessory tool stowage system of the present invention.

Referring now to FIG. 2, there is shown dispensing gun 100*b*, which similarly includes a frame body 110 formed by a handle housing 120 and a cartridge frame 130 coupled to the handle housing 120 to extend longitudinally therefrom. The handle housing 120 includes a handle member 140 extending in a transverse direction with respect to the longitudinal direction of the cartridge frame 130, as is conventional. The handle housing 120 also includes a trigger member 142 that is pivotally connected to the handle member 140 by a pivot member 144 and operatively coupled to a drive mechanism 300 of the dispensing gun 100*a*. Dispensing of the work material from a cartridge disposed in the cartridge receiving space 138 is achieved by displacement of the drive member 310 longitudinally, which thereby displaces the plunger disc 312 toward the front support member 136 within the cartridge receiving space 138. The advancement of the drive member 310, and the plunger disc 312 therewith, toward the front support member 136 is driven by the drive mechanism 300 located in the handle housing 120. The drive member 310 passes displaceably through the handle housing 120 and the cartridge receiving space 138 of the cartridge frame 130 responsive to displacement of the trigger member 142 toward the handle member 140 by a connection of the trigger member 142 to the drive mechanism 300. With a cartridge containing the work material disposed in the cartridge receiving space 138, the advancement of the drive member 310 toward the front support member 136 displaces a piston disc within the cartridge (not shown) to displace the work material through an open nozzle of the work material containing cartridge.

Dispensing gun 100*b* is like that of dispensing gun 100*a*, previously described, but has a handle housing 120 with a greater longitudinal extent, sufficient for the accessory finishing tool 170 to be oriented longitudinally. Also, the accessory tool stowage system 200*a* of the for stowage of the accessory finishing tool 170 is disposed on an opposing side of handle housing 120 from that of dispensing gun 100*a* in order to avoid interference with a nozzle tip cutting feature (not shown) disposed in the handle housing 120 of dispensing gun 100*b* and accessible on the left side of the dispensing gun. The post 214 protrudes from the handle housing portion of the frame body 110. The receptacle 172 of finishing tool 170 is releasably engaged to the post 214 of accessory tool stowage system 200*a* in the manner described for dispensing gun 100*a*. Accessory tool stowage system 200*b* is arbitrarily disposed on an opposing side of the cartridge frame member 134 in correspondence with that of accessory tool stowage system 200*a* for no other reason other than it is believed that such might provide more convenience to a user. Accessory tool stowage system 200*b* has at least one post 224 protruding from the cartridge frame member 134 and the accessory tool 180 is releasably engaged therewith. As the accessory tool 180 is a scraper/smoothing type tool, with greater longitudinal extent than that of the finishing type accessory tool 170, accessory tool stowage system 200*b*, as shown, makes use of a pair of posts 224 and 225. The receptacles 182 and 184 of the scraper/smoothing tool 180 are respectively releasably engaged to the posts 224 and 225 of accessory tool stowage system 200*a* in the manner described for dispensing gun 100*a*. Greater details of the structure of accessory tool stowage systems 200*a* and 200*b* will be described in following paragraphs.

Figure 3:
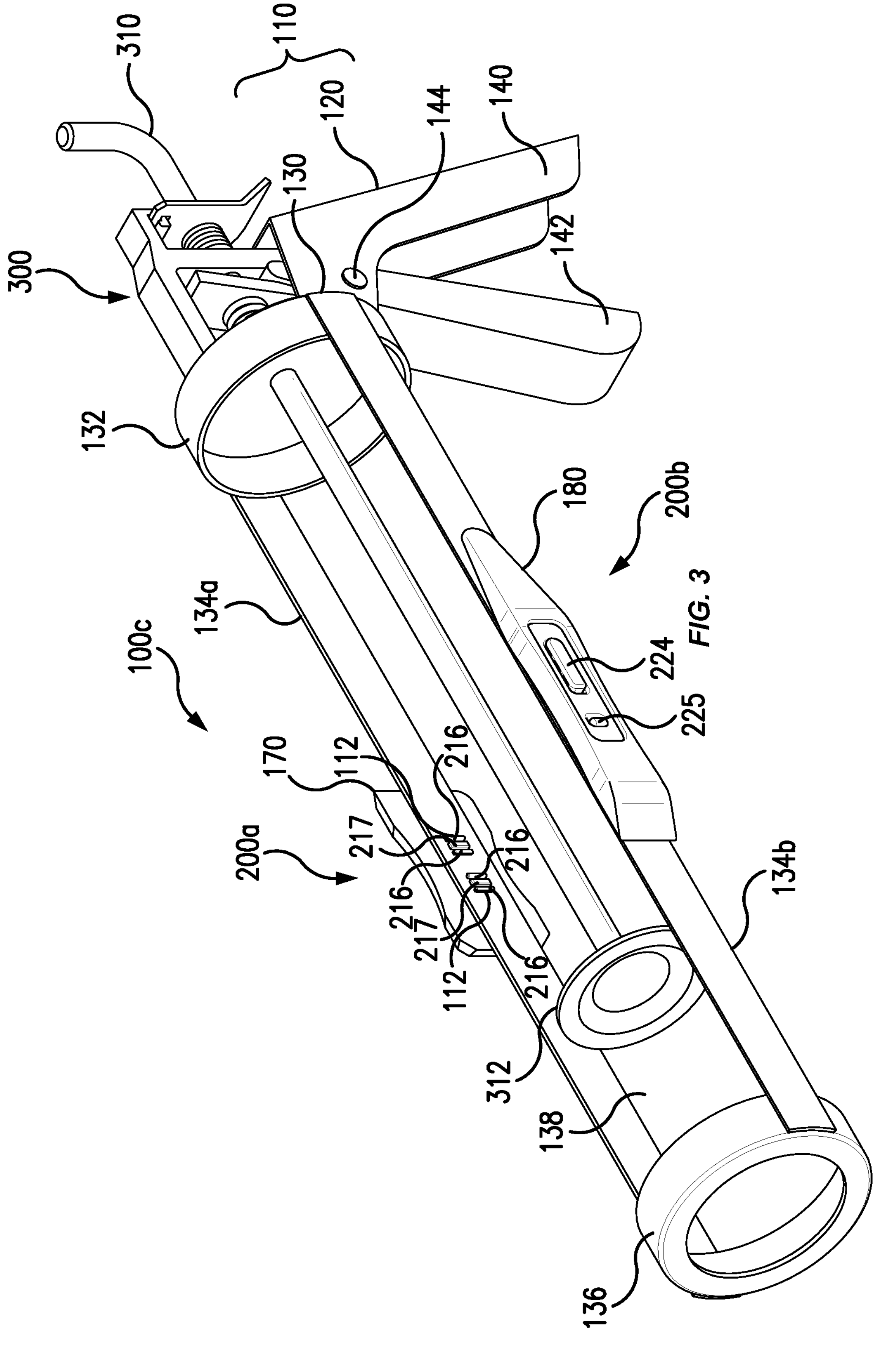
FIG. 3 is a right-side perspective view of yet another exemplary dispensing gun with an onboard accessory tool stowage system of the present invention.

In FIG. 3, there is shown dispensing gun 100*c* wherein frame body 110 differs substantially from that of dispensing guns 100*a* and 100*b*. The frame body 110 of dispensing gun 100*c* includes a handle housing 120 and a cartridge frame 130 the extend longitudinally from the handle housing 120. However, the handle housing is truncated in the transverse direction (transverse with respect to the longitudinal direction) and therefore only partially encloses the drive mechanism 300. Similarly, to the previously discussed dispensing guns 100*a* and 100*b*, the handle housing 120 includes a handle member 140 and a trigger member 142 pivotally coupled to the handle member 140 by a pivot member 144. A further distinction of dispensing gun 100*c* is found in the structure of the cartridge frame 130. Cartridge frame 130 includes a pair of diametrically opposed cartridge frame members 134*a* and 134*b* that extend longitudinally between the rear support member 132 and the front support member 136, defining the cartridge receiving space 138 therebetween. The rear support member 132 may be fixedly secured to the handle housing 120, as in the previously discussed dispensing guns 1001, 100*b*, or rotatably coupled thereto methods and coupling elements well known in the art, and therefore not discussed herein.

Due to the truncated nature of the handle housing 120 of dispensing gun 100*c*, either one, or both of accessory tool stowage systems 200*a*, 200*b* are disposed on the cartridge frame 130 of the frame body 110. While each of the accessory tool stowage systems 200*a*, 200*b* are illustrated as being disposed on a different one of the cartridge frame members 134*a* and 134*b*, they may also both be disposed on either one of the cartridge frame members 134*a*, 134*b* in longitudinally spaced relationship.

Hereto, the Accessory tool stowage system 200*b* has at least one post 224 protruding from the cartridge frame portion of the frame body 110, specifically, the cartridge frame member 134*b*, and the accessory tool 180 is releasably engaged therewith. As the accessory tool 180 is a scraper/smoothing type tool, with greater longitudinal extent than that of the finishing type accessory tool 170, accessory tool stowage system 200*b*, as shown, makes use of a pair of protruding posts 224 and 225 respectively releasably engaged by at least one receptacle of the accessory tool 180, as will be described in following paragraphs. Accessory tool stowage system 200*a* includes a retention mounting clip (not shown in the figure) coupled to the cartridge frame member 134*a* by a plurality of tangs 216 respectively engaging the cartridge frame member 134*a* through corresponding mounting holes 112. As will be further described in following paragraphs, between each pair to tangs 216 there is disposed a reinforcement post 217 extending through the corresponding mounting hole 112. The retention mounting clip includes a protruding post upon which the finishing type accessory tool is releasable engaged.

Figure 14:
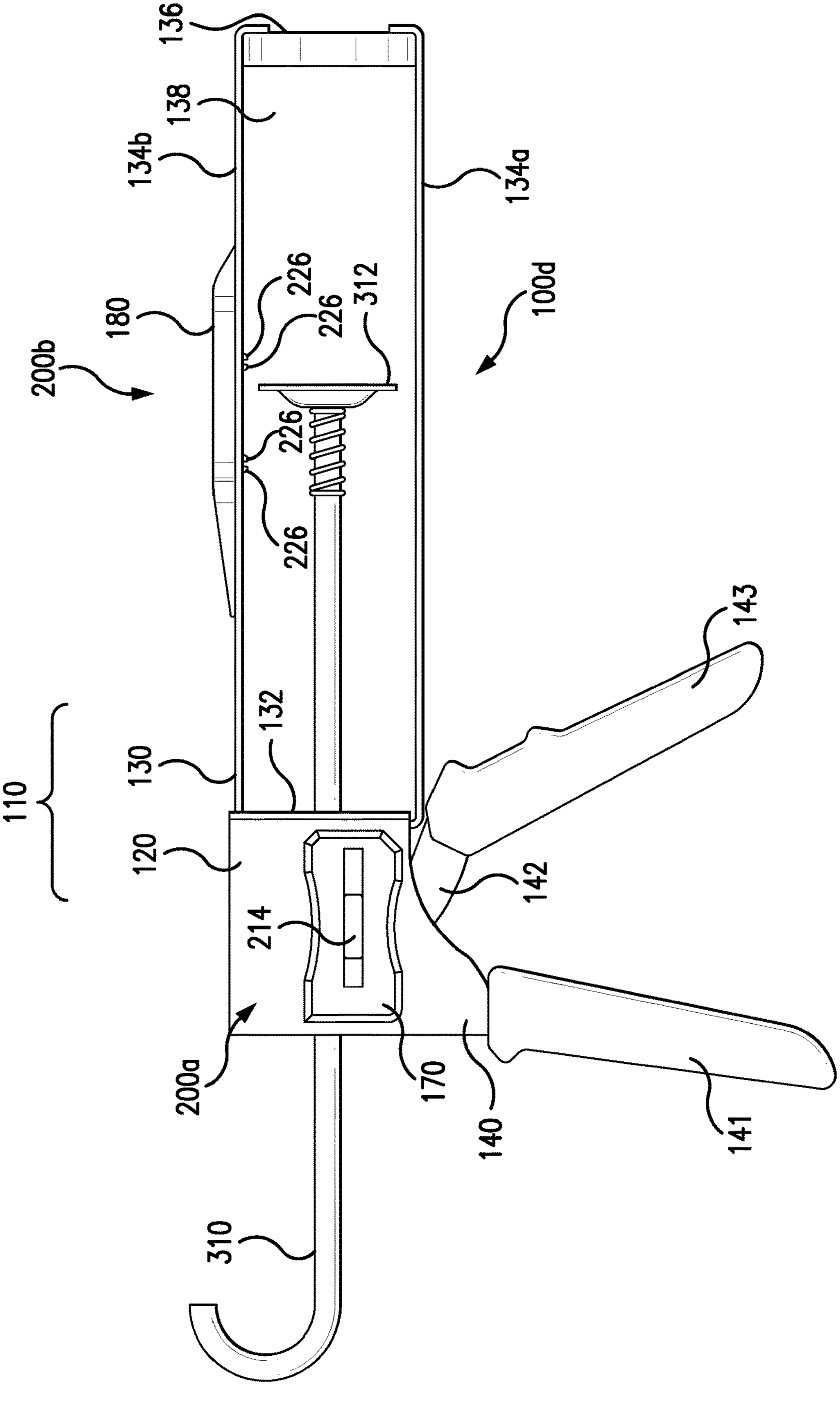
FIG. 14 is an elevation view of a further exemplary dispensing gun with an onboard accessory tool stowage system of the present invention.

Turning now to FIG. 14, there is shown yet another style of dispensing gun. Dispensing gun 100*d* includes a frame body 110 that includes a handle hosing 120 and a cartridge frame 130 extending longitudinally from the handle housing 120. Handle housing 120 encloses a drive mechanism (not shown), as is conventional in such dispensing guns. The handle housing 120 further includes a handle member 140 which may in turn include a grip 141 sleeved thereon, and a trigger member 142 pivotally coupled to the handle housing, which likewise may include a grip 143 sleeved thereon. As is conventional, the drive mechanism is actuated to displace the drive member 310 longitudinally toward the front support member 136 responsive to the operation of the trigger member 142 in the manner previously described.

The cartridge frame 130 includes rear support member 132 affixed to the handle housing 120 and a pair of frame members 134*a* and 134*b* extending longitudinally to a front support member 136. Front support member 136 has an annular contour into which the nozzle portion of a work material cartridge is received. Hereto, front support member 136 may be formed with an open portion thereof to function as a passageway for the nozzle portion of the work material cartage to pass therethrough during insertion and removal of the cartridge into and out from the cartridge receiving space 138 that is bounded by the front and rear support members 136 and 132, and the pair of diametrically opposed cartridge frame members 134*a* and 134*b*.

The frame body 110 also includes at least one of the accessory tool stowage system 200*a*, 200*b*. In the exemplary frame body 110 of dispensing gun 100*d* illustrated, the accessory tool stowage system 200*a* is disposed on the handle housing portion of the frame body 110, with a post 214 protruding therefrom. The accessory finishing tool 170 is releasably engaged with the post 214, in the manner previously described with respect to dispensing guns 100*a*, 100*b* and 100*c*. Hereto, the accessory tool stowage system 200*b* is disposed on the cartridge frame portion of the frame body, specifically, but arbitrarily, the cartridge frame member 134*b*, and the accessory tool 180 releasably engaged therewith. It should be noted that any one or both of the accessory tool stowage systems 200*a*, 200*b*, as well as multiples thereof, may be positioned on one or both cartridge frame members 134*a*, 134*b*.

Figure 5:
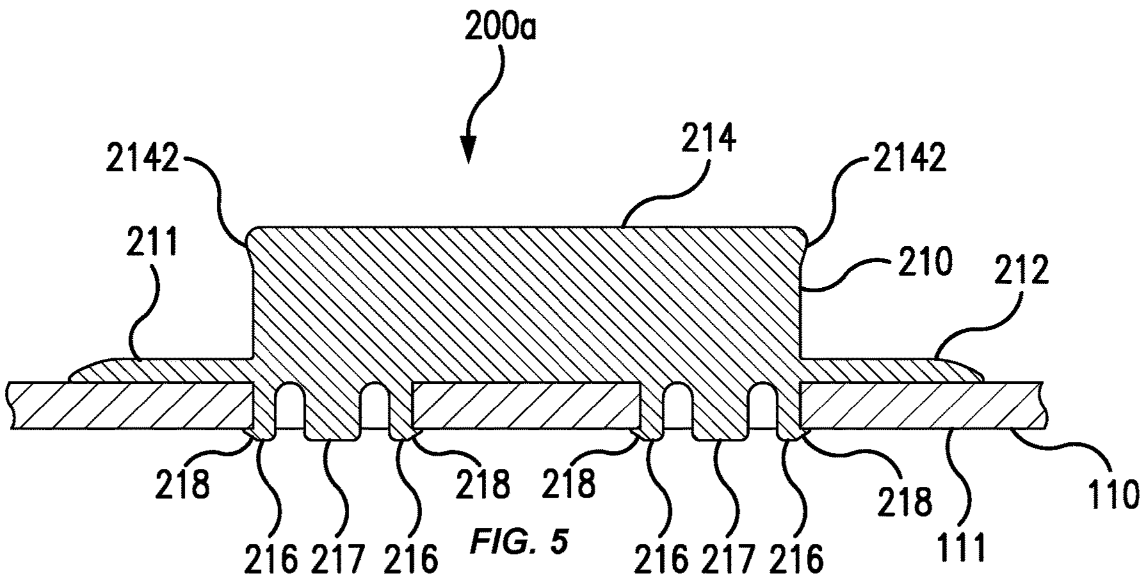
FIG. 5 is a cross-sectional view of a retention mounting structure of the present invention engaged with a frame body of a dispensing gun.
Figure 6:
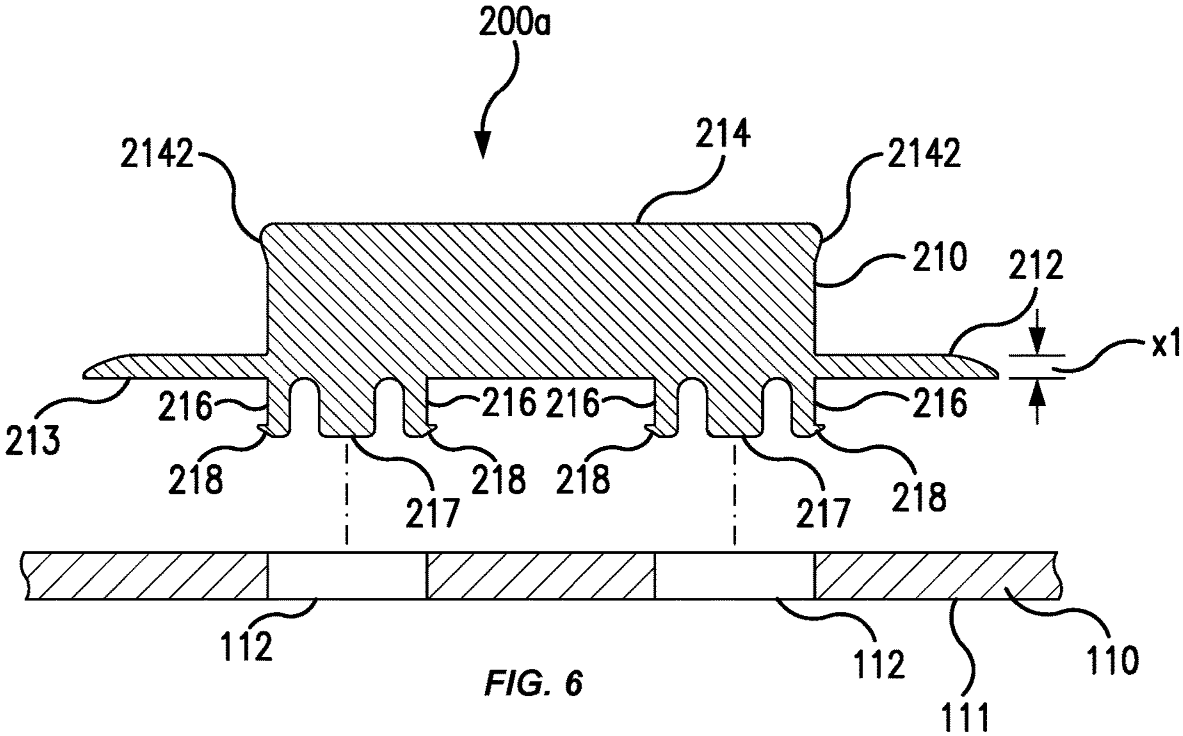
FIG. 6 is an exploded cross-sectional view of the retention mounting structure of FIG. 5.

Turning now to FIGS. 5-8, there are illustrated configurations of accessory tool stowage system 200*a*. As illustrated in FIGS. 5 and 6, accessory tool stowage system 200*a* includes a retention mounting clip 210 having a base 212 configured for fixation to the frame body 110 of any of dispensing guns 100*a*. 100*b*, 100*c* and 100*d*. Retention mounting clip 210 may be formed of any suitable material having the necessary strength and resilience for the application, of which may include metallic materials, polymeric compositions, and combinations thereof. The retention mounting clip 210 includes a post 214 extending outwardly from an upper surface 211 of the base 212. The accessory finishing tool 170 that is intended to be releasably coupled to the post 214 when stowed thereon may be formed of a variety of materials having different amounts flexibility or resilience. Where the material is relatively soft and flexible the releasable engagement between the accessory tool 170 and the post 214 may be a frictional type engagement, where the receptacle of the accessory tool mating with the post 214 is an interference fit that relies on a degree of compression of the interior sides of the accessory tool's receptacle for retention on the post 214. Where the material of the accessor tool 170 is less flexible the post 214 may be formed with retention protuberances 2142 extending laterally at opposing ends of the post 214. The protuberances 2142 may also be employed where the material of accessory tool 170 is relatively soft and flexible, as well.

Figure 12:
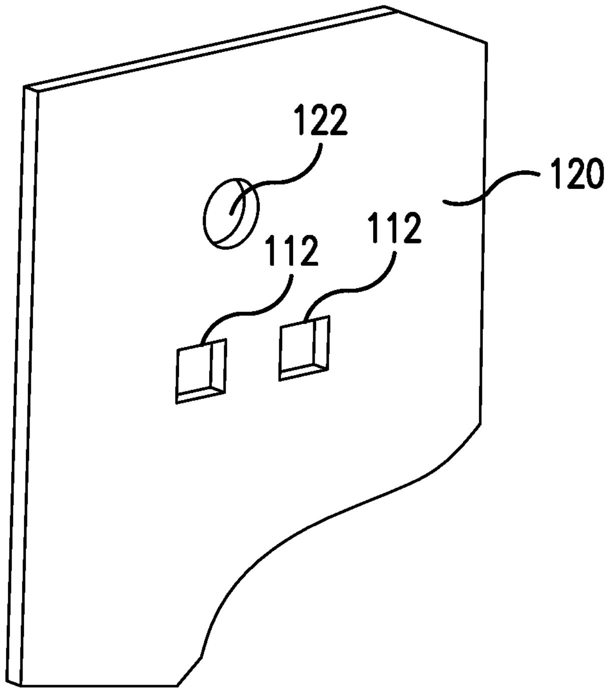
FIG. 12 is an isolated perspective view of a portion of the handle housing showing mounting holes formed therein for fixation of a retention mounting structure of the present invention.
Figure 13:
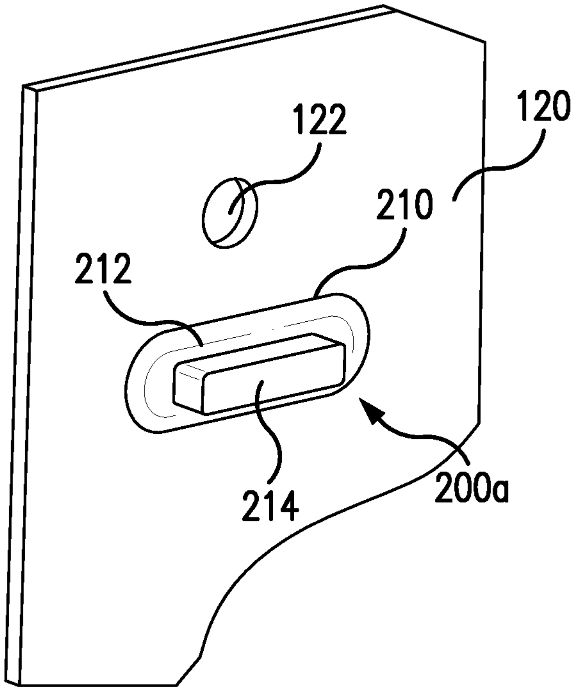
FIG. 13 is an isolated perspective view of the portion of the handle housing shown in FIG. 12 with a retention mounting structure of the present invention affixed thereto.

The base 212 of retention mounting clip 210 has an opposing lower surface 213 with a plurality of tangs 216 extending therefrom for engagement with an interior facing surface 111 of the frame body 110 through corresponding mounting holes 112. The plurality of tangs 216 are arranges in pairs, with a reinforcement post 217 extending away from the lower surface 111 of the base 212 between a corresponding pair of tangs 216. The reinforcement post 217 provides added strength against rotative displacement of the retention mounting clip 210. Each tang 216 of a respective pair of tangs has a barb 218 extending in a direction from the reinforcement post 217 to engage the interior facing surface 111 of the frame body 110 after being passed through corresponding mounting holes 112 formed through the frame body 110. Thus, as shown in FIGS. 12 and 13, a pair rectangular mounting holes 112 are formed through the handle housing 120 sufficiently spaced from the trigger pivot mounting hole 122 to avoid interference between the pivot member and the accessory tool stowed on the post 214. The retention mounting clip 210 of accessory tool stowage system 200*a* can then be affixed to the handle housing 120 by the passage of the tangs 216 and posts 217 through the corresponding mounting holes 112, as previously described.

Figure 7:
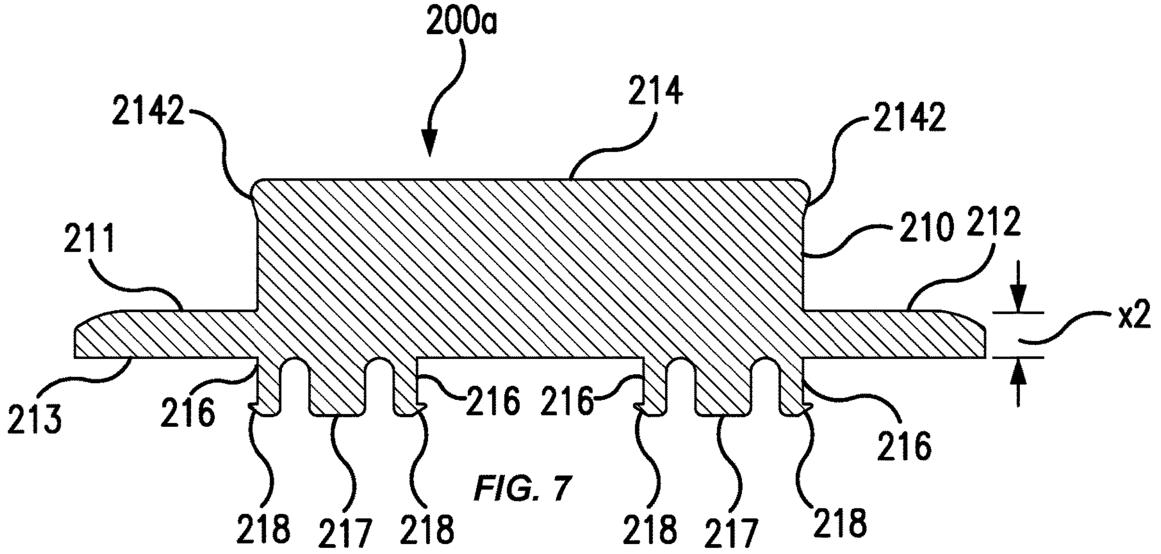
FIG. 7 is a cross-sectional view of a retention mounting structure of the present invention with a thickened base.

As indicated in FIG. 6, the base 212 may be formed with a thickness x1 that provides the necessary mechanical strength necessary for the retention mounting clip 210 to fulfill its intended purpose. In order that the accessory tool rests contiguously with respect to the frame body 110, a portion of the lower surface of the accessory tool may be relieved to receive the base therein (not shown). However, there are some applications where structures on the dispensing gun, such as fasteners, pivot members, stiffening ribs, and the like, would interfere with the contiguous disposition of the accessory tool 170, where the base has the thickness x1. As shown in FIG. 7, the retention mounting clip 210 has a base 212 formed with a thickness x2, a thickness selected to be sufficient to elevate the accessory tool 170 above or to the same elevation of a dispensing gun structure that would otherwise interfere therewith.

Figure 4:
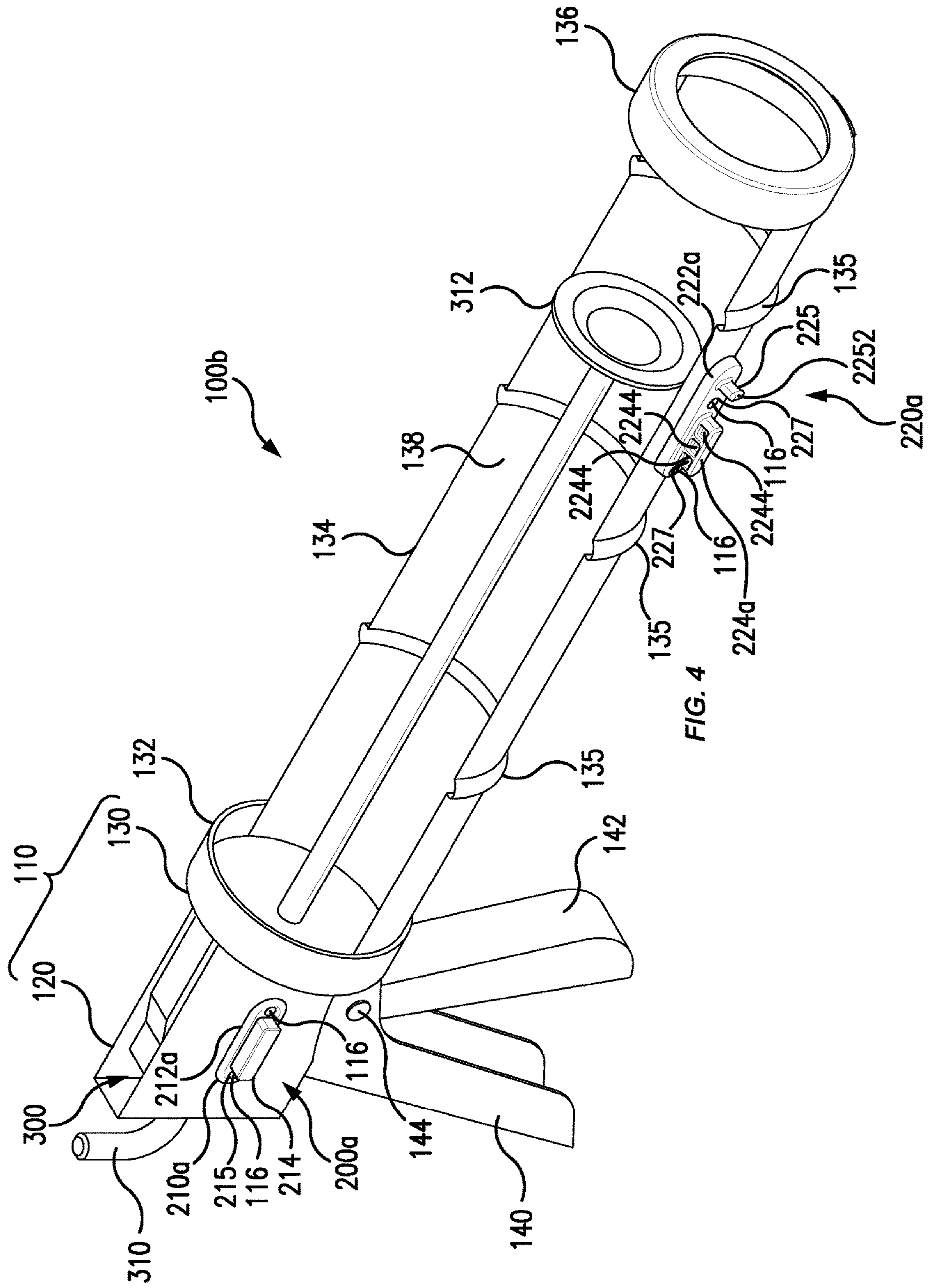
FIG. 4 is a right side perspective view of the exemplary dispensing gun of FIG. 2 with the accessory tools removed and the retention mounting structures secured by discrete fasteners.
Figure 8:
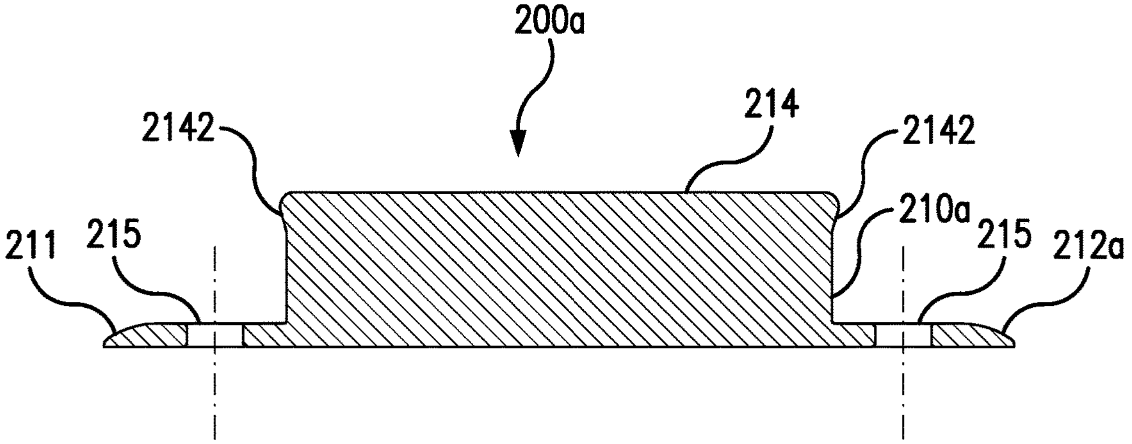
FIG. 8 is a cross-sectional view of a configuration of the retention mounting structure of FIGS. 5 and 6 configured for fastener fixation as illustrated in FIG. 4.

Referring FIG. 8, an alternate configuration of accessory tool stowage system 200*a* is shown to include a retention mounting clip 210*a*. Retention mounting clip 210*a* includes a post 214 extending outwardly from an upper surface 211 of the base 212*a*. The post 214 may be formed with retention protuberances 2142 on opposing longitudinal sides of the distal end of the post 214, as previously described. Retention mounting clip 210*a* is configured for retention to the frame body 110 by the formation of mounting holes 215 formed through the base 212*a* and through which fasteners are passed. As illustrated in FIG. 4, the retention mounting clip 210*a* is affixed to the handle housing portion 120 of the frame body 110 by a pair of fasteners 116 passed through the mounting holes 215 for fixation to the handle housing 120. Fasteners 116 can be of any type known in the art, including screws, rivets, plastic snap type insert fasteners, and the like. Base 212*a* may also be formed with any selected thickness, as required for the proper disposition of the accessory tool 170 on the frame body 110.

Figure 16:
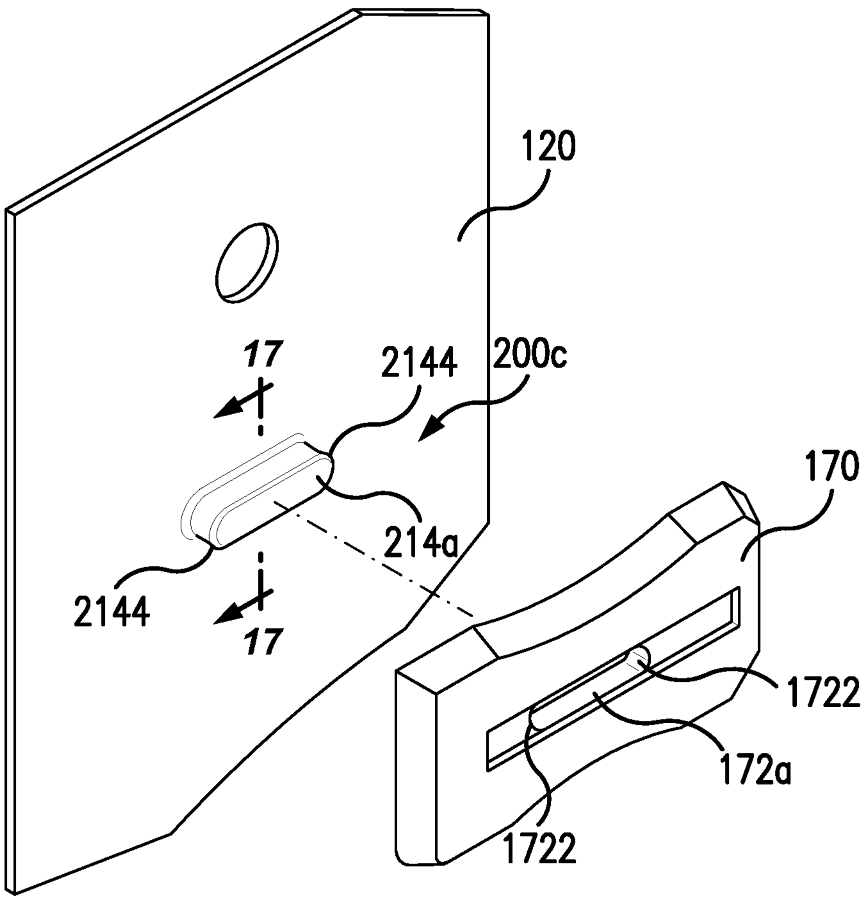
FIG. 16 is an isolated exploded perspective view of the portion of a dispensing gun handle housing with an accessory tool stowage system integrally formed in one-piece formation therewith and a matingly configured accessory tool for stowage thereon.
Figure 17:
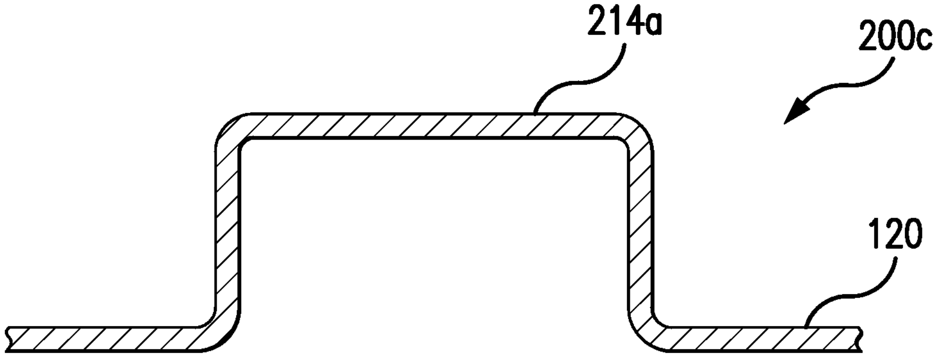
FIG. 17 is a cut-away cross-sectional view of the post taken with respect to the section line 17-17 in FIG. 16.

Turning now to FIGS. 16 and 17, there is shown a simple configuration of the accessory tool stowage system suitable for use on any od dispensing guns 100*a*, 100*b*, 100*c* and 100*d*. Accessory tool stowage system 200*c* may be substituted for accessory tool stowage system 200*a* described above. Rather than a retention mounting clip that has a base from which a post extends, accessory tool stowage system 200*c* includes just a post 214*a* that is integrally formed in the frame body, and in particular handle housing 120 of dispensing guns 100*a*, 100*b*, and 100*d*. While the post may be integrally formed in some configurations of the cartridge frame members of the cartridge frame 130, it is believed that the handle housing 120 is best suited for the integral formation of the post 214*a* therein, using current medal forming techniques. The post 214*a*, however, rather than having a parallelepiped configuration, has semicylindrical end walls. The rounded end walls are more easily formed when the post is stamped in the material of the handle housing 120, or cartridge frame members of the cartridge frame 130. Accordingly, the end walls 1722 of the receptacle 172*a* of accessory tool 170 are likewise radiused to be complementary to the contour of the post 214*a*.

Figure 18:
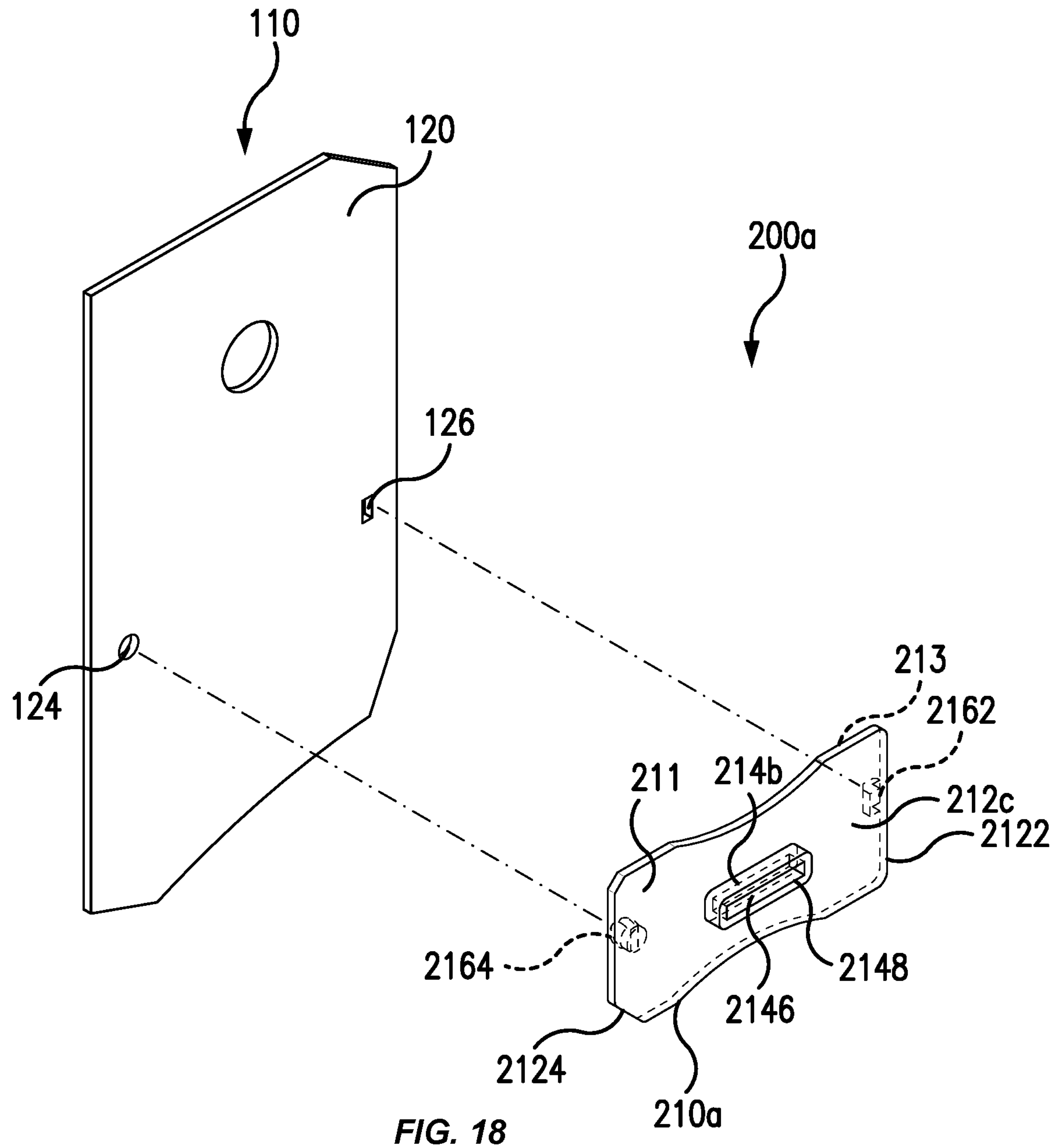
FIG. 18 is an isolated exploded perspective view of the portion of a dispensing gun handle housing with an alternate configuration of a retention mounting clip of the present invention.
Figure 19:
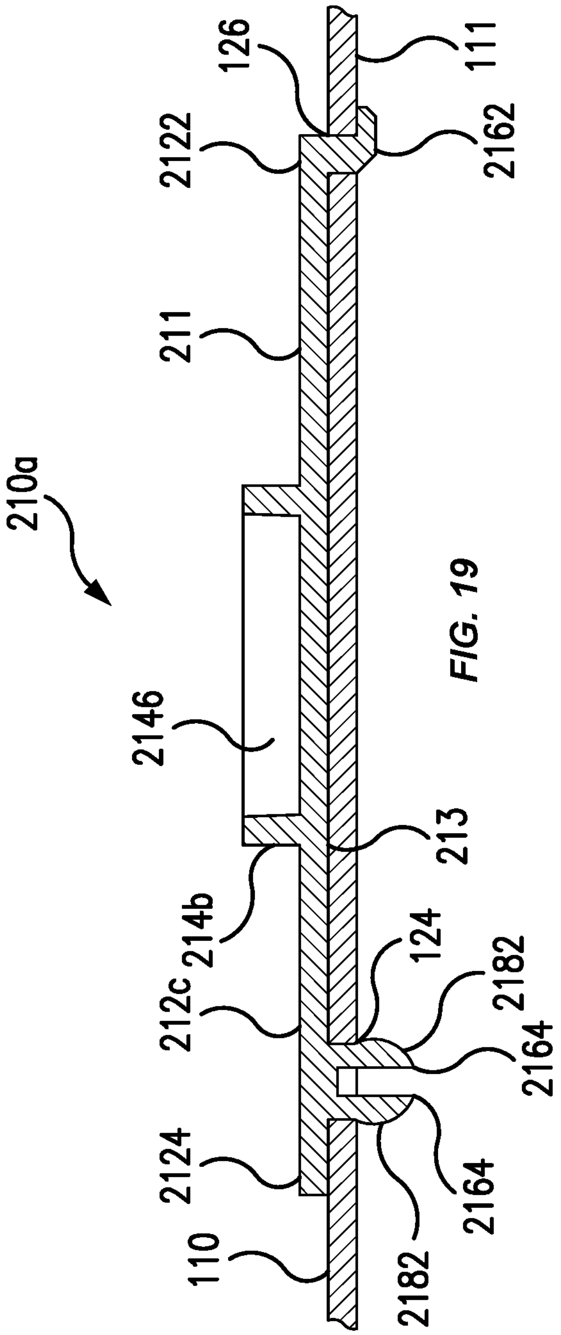
FIG. 19 is a cross-sectional view of the retention mounting clip of FIG. 18 engaged with a frame body of a dispensing gun.

FIGS. 18 and 19 show another configuration of the accessory tool stowage system 200*a* that includes a retention mounting clip 210*a*. Retention mounting clip 210*a* includes a base 212*c* from which the post 214*b* extends outwardly from an outer surface 211 of the base 212*c*. Although not important to the inventive concepts disclosed herein, the base 212*c* may have a contour emulating that of the accessory tool 170 intended to be stowed on the accessory tool stowage system 200*a*, and may have a thickness as may be required to suit the location for the stowage of the accessory tool 170. Post 214*b* has an open recess 2146 formed therein and creating a hollow structure that allows for some flexure of the circumferential wall 2148 surrounding the recess and that defines the post 214*a*.

The base 212*c* has a lower surface 213 configured for fixation to the frame body 110. At one end 2122 of the base 212*c* there is formed an L-shaped tab 2162 extending from the lower surface 213 for engagement with the interior facing surface 111 of the frame body 110 through a slotted opening 126 formed through a portion of the frame body 110, which portion may be the handle housing, as illustrated in FIG. 18, or a cartridge frame member 134, 324*a*, 134*b* of the cartridge frame 130. Adjacent to an opposing end of the base 212*c*, a pair of tangs 2164, 2164 extend from the lower surface 213 of the base 212*c* and pass through a corresponding mounting hole 124. Each of the tangs 2164 has a barb or protuberance 2182 that engages the interior facing surface 111 of the frame body 110 after passing through the mounting hole 124.

Figure 9:
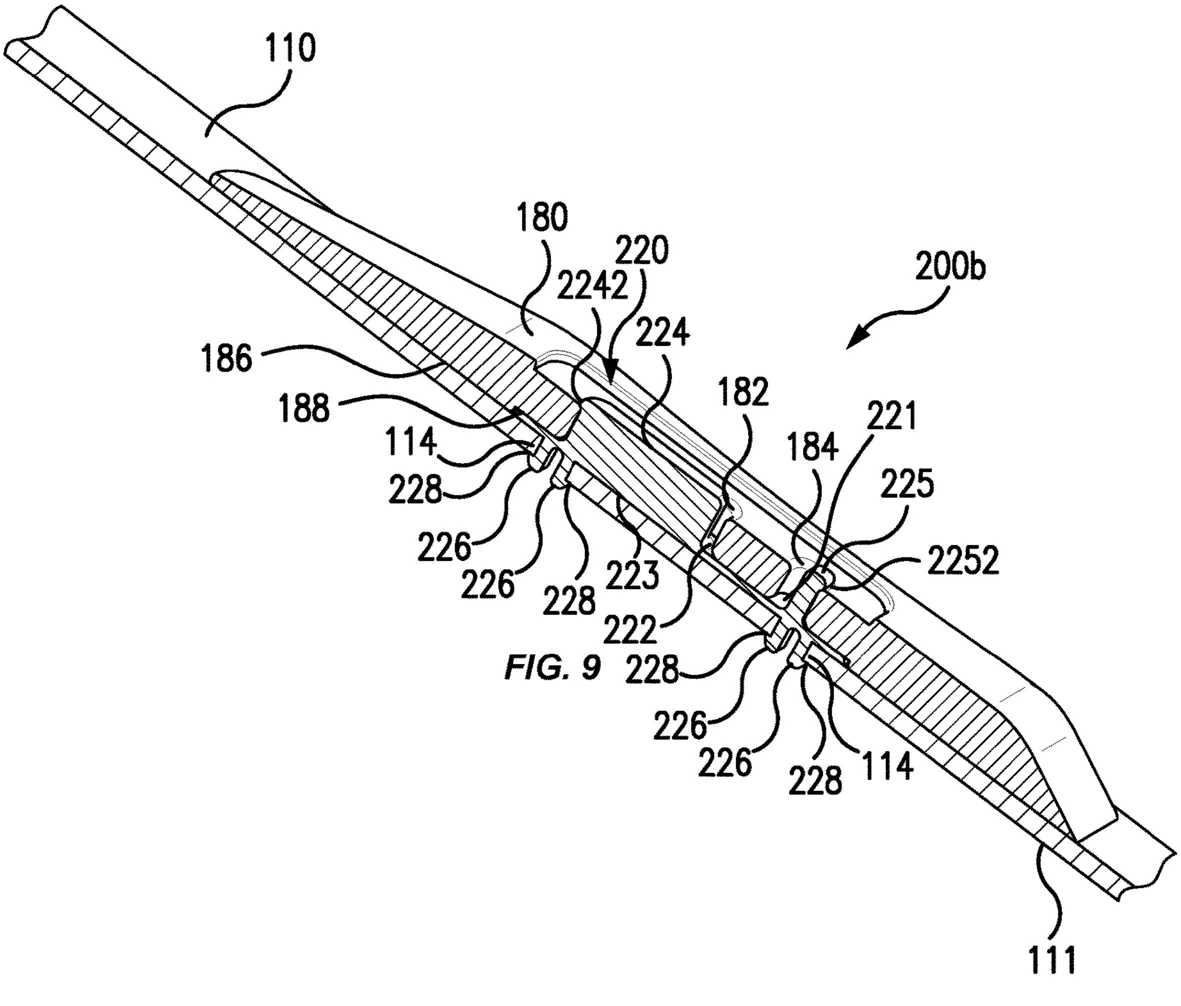
FIG. 9 is a cross-sectional view of a portion of the present invention including a second retention mounting structure affixed to the frame body and a second accessory tool stowed thereon.

With reference to FIG. 9, the structure of the accessory tool stowage system 200*b* will now be described. Accessory tool stowage system 200*b* includes a retention mounting clip 220 which is configured for releasable engagement by the accessory scraper/smoothing tool 180, and configured for fixation to the frame body 110 of any of the dispensing guns 100*a*. 100*b*, 100*c* and 100*d*. Retention mounting clip 220 includes a base 222 having an upper surface 221 from which a pair of longitudinally spaced posts 224 and 225 extend. Each of the two posts 224 and 225 respectively have a retention protuberance formed on longitudinal end portions thereof adjacent distal ends of the respective post and facing in opposing longitudinal directions. In correspondence therewith, the accessory tool 180 may have a pair of receptacles 182 and 184 into which the pair of posts 224 and 225 are respectively releasably engaged. The respective protuberance 2242, 2252 of each post 224, 225 releasably engages opposing longitudinal facing ends of the respective receptacles 182, 184.

Figure 9A:
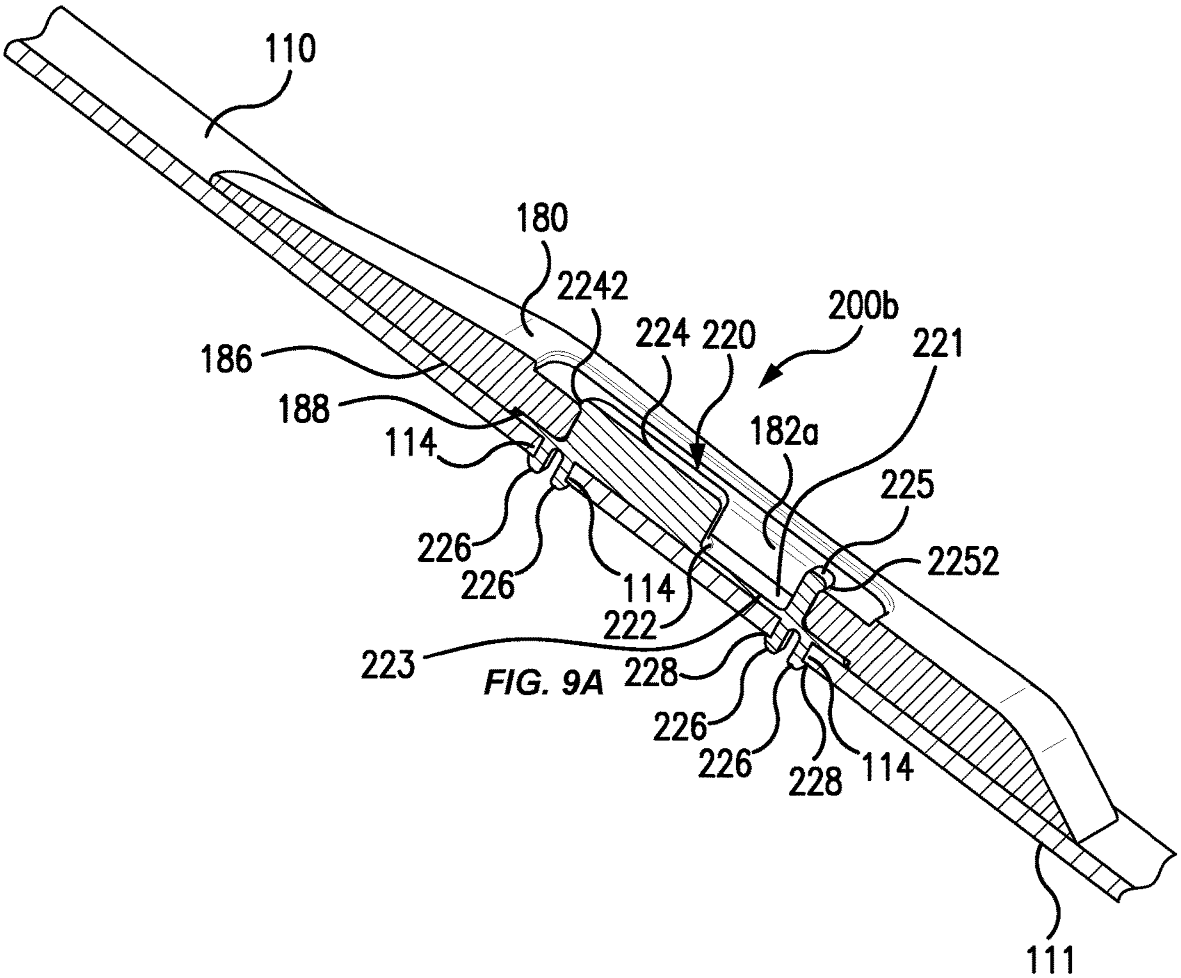
FIG. 9A is a s a cross-sectional view of a portion of the present invention including the second retention mounting structure affixed to the frame body and a second accessory tool having a single receptacle being stowed thereon.
Figure 10:
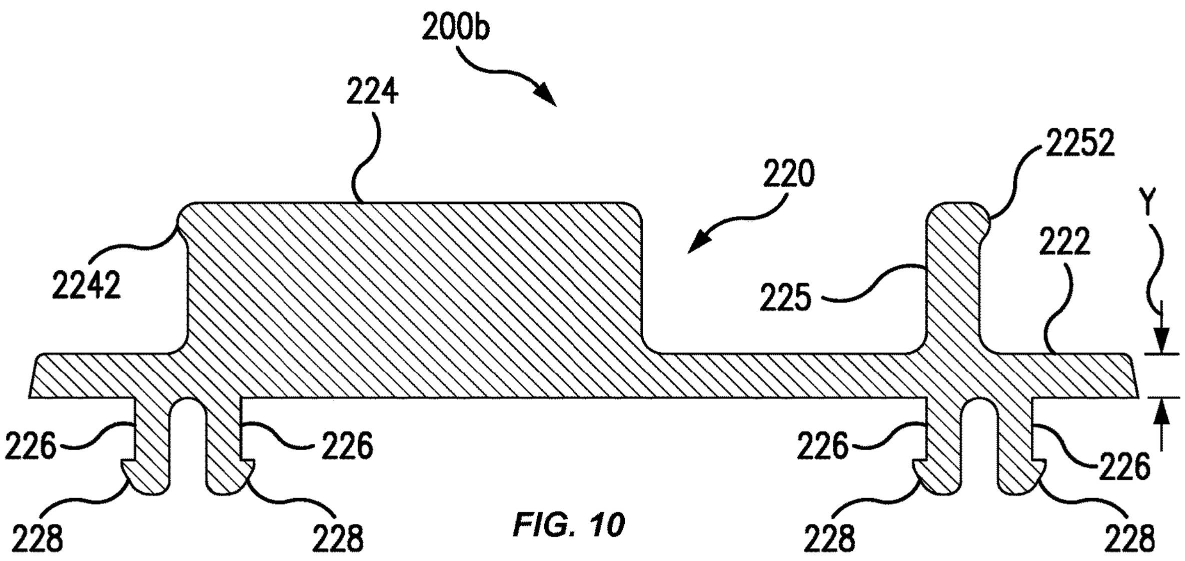
FIG. 10 is a cross-sectional view of the second retention mounting structure of the present invention with a thickened base.

Alternately, as shown in FIG. 9A, the accessory tool 180 may be formed with a single receptacle 182*a* for releasable engagement with both posts 224 and 225, where the respective retention protuberance 2242, 2252 of each post 224, 225 releasably engaging an opposing longitudinal end of the single receptacle 182*a*. As shown in both FIGS. 9 and 9A, the accessory tool 180 may further have a recess 188 formed in the lower surface 186 thereof into which the base 222 of the retention mounting clip 220 is received, to thereby permit the accessory tool to rest in contiguous contact with the frame body 110 to which the retention mounting clip 220 is affixed.

The post 224, having a substantial longitudinal extent as compared to the post 225 is not very flexible, if at all, and as the accessory tool 180 is also not very flexible, there is a need for some resilience in the retention mounting clip structure to accommodate the tool's engagement and disengagement therefrom. That need is fulfilled by the post 225 which has a much narrower longitudinal extent and resiliently cantilevered from the base 222. Thus, when the accessory tool is set on the pair of posts 224 and 225, and then pushed down to seat the accessory tool 180 on the retention clip 220, the flexible post 225 is displaced by a camming action of the retention protuberance 2252 against a corresponding internal surface of a receptacle 184 or 182*a*, until the accessory tool 180 is fully seated. At that point, the resilience of the post 225 allows it to elastically spring back and the retention protuberance 2252 engages an upper surface of the accessory tool 180. When the accessory tool 180 is being removed from the retention clip 220, the flexible post 225 is similarly displaced by the camming action of the retention protuberance 2252 as it is drawn into receptacle 184 or 182*a* to thereby release the engagement thereof with the accessory tool 180.

The retention clip 220 may be affixed to the frame body 110 by a plurality of tangs 226 that extend from the lower surface 223 of the base 222. The plurality of tangs 226 are arranged in pairs with each tang 226 of a respective pair of tangs having a barb 228 formed on a distal end thereof extending laterally in a direction opposite to that of the barb 228 of the adjacent tang 226 of that pair of tangs. Each of the barbs 228 pair of tangs 226 engage the interior facing surface 111 of the frame body portion to which the retention mounting clip 220 is mounted through corresponding mounting holes 114 formed through the that frame body portion.

It should be understood that the base 222 retention mounting clip 220 of accessory tool stowage system 200*b* may have any thickness as necessary to suit the required clearance need avoid interference with other structures of the dispensing gun 100*a*. 100*b*, 100*c* and 100*d*. With additional reference to FIG. 10, the base 222 is shown to have a thickness Y which is selected to best suit the location to which retention mounting clip 220 is mounted. For example, in the application of retention mounting clip 220 to dispensing guns 100*c* and 100*d*, shown in FIGS. 3 and 14, respectively, the thickness Y of the base in those application is chosen based on the structural requirements for mounting to the cartridge frame member 134*b* and the retentive engagement with the accessory tool 180. Whereas, in the application of retention mounting clip 220 to dispensing guns 100*a*, 100*b*, for example, as shown in FIGS. 1 and 2, the thickness Y of the base 222 is chosen to elevate the accessory tool 180 sufficiently to clear the ribs 135, and for stability, preferable rest upon the ribs 135.

Figure 11:
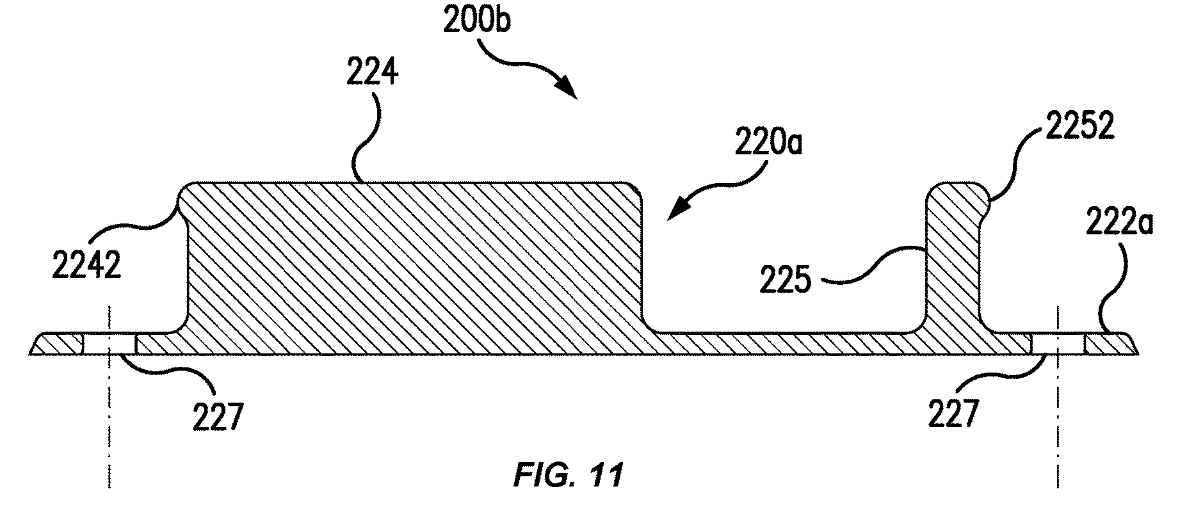
FIG. 11 is a cross-sectional view of a configuration of the second retention mounting structure of FIGS. 9 and 9A configured for fastener fixation as illustrated in FIG. 4.

Another version of the retention mounting clip of accessory tool stowage system 200*b* is shown in FIG. 11. Here, the retention mounting clip 220*a* is configured for fixation to the frame body through the use of discrete fasteners of any type known in the art, including screws, rivets, plastic snap type insert fasteners, and the like. Retention mounting clip 220*a* includes a base 222*a* from which the posts 224 and 225 extend. The base 222*a* includes mounting holes 227 through which discrete fasteners are passed to engage corresponding mounting holes formed in the frame body portion to which the retention mounting clip 220*a* is being affixed. The base 222*a*, like that of the base 222 of retention mounting clip 220, has a thickness Y (not indicated in the drawing figure) which is selected to best suit the location to which retention mounting clip 220*a* is mounted.

Figure 15:
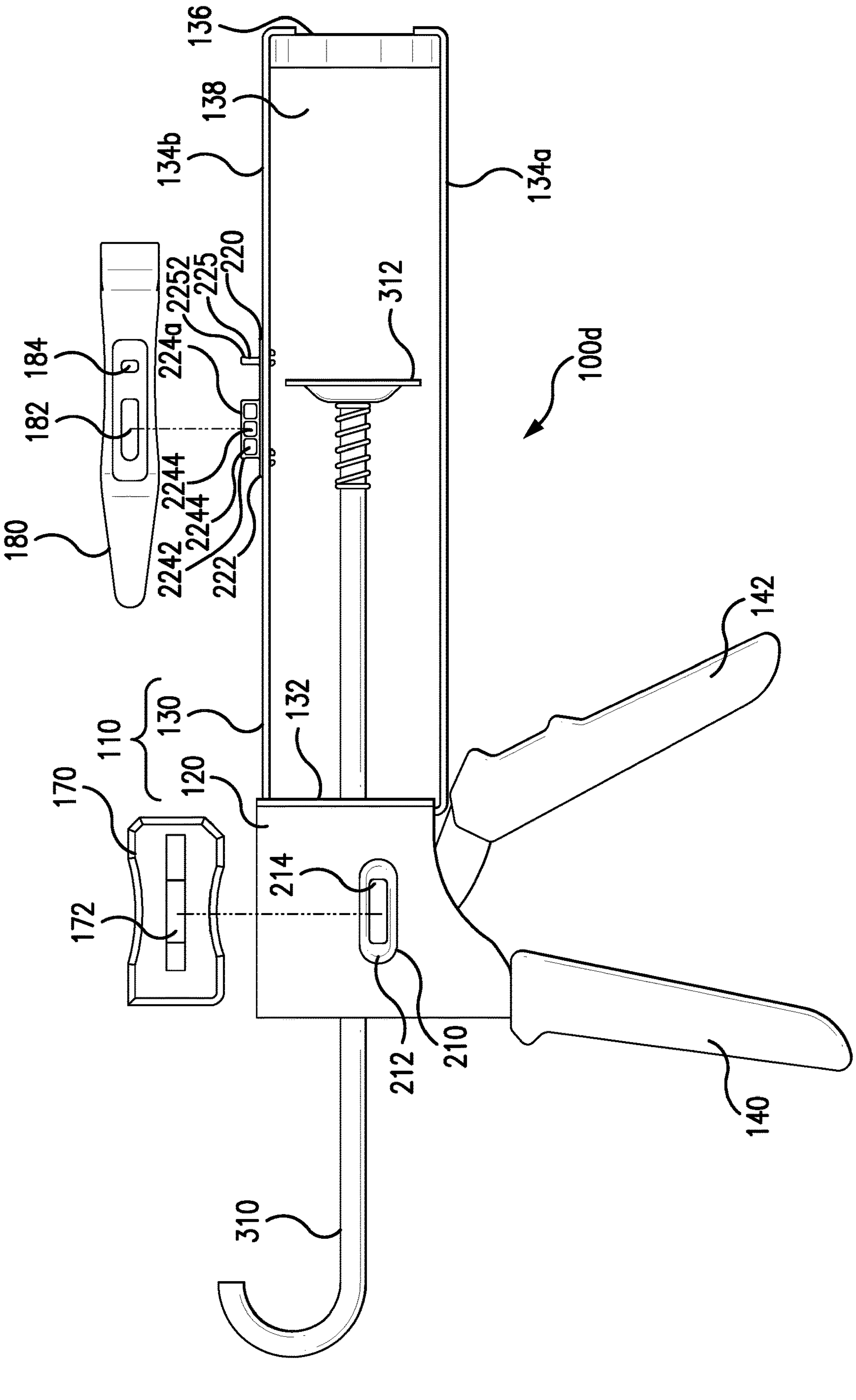
FIG. 15 is an exploded elevation view of the exemplary dispensing gun of FIG. 14 with the accessory tools separated from their mounting to expose the retention mounting structures of the present invention.

Referring back to FIG. 4, the retention mounting clip 220*a* is shown affixed to the cartridge frame member 134 by a pair of discrete fasteners 116 that pass through the mounting holes 227 to secure retention mounting clip 220*a* to cartridge frame member 134. Here you will note, the base 222*a* is substantially thicker than that illustrated in FIG. 11, allowing the accessory tool 180 to rest on the stiffening ribs 135, as shown in FIG. 2. Referring additionally to FIG. 15, wherein an exemplary version of the dispensing gun 100*d* is illustrated with the accessory tools 170 and 180 separated from their respective retention mounting clips. In both of FIGS. 4 and 14, a like variation of the mounting clips 220 and 220*a* are shown. Specifically, where it is desired that the post 224 be more flexible for ease of engagement and disengagement of the accessory tool 180, which may be due to one or more characteristics of the material from which it is made, for example lubricity, the mounting clip 220 or 220*a* may be formed with a post 224*a*. The post 224*a* differs from the post 224 only in that post 224*a* includes a plurality of laterally directed openings formed therethrough. By that arrangement the post 224*a*, while not as flexible as the post 225, is more flexible than the post 224 previously described.

The various portions, parts, and components of the systems disclosed herein may be formed of any suitable material known in the art for the particular requirements of the intended applications. Metallic, polymeric, rubber, synthetic rubber and other such materials, as well as combinations thereof, may be employed in view of such factors as the required combination of strength, rigidity, weight, and the like. The inventive concepts disclosed herein are not limited to any specific choice of such material compositions or their combinations.

Although the inventive concepts disclosed herein have has been described in connection with specific exemplary forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of the elements or processes may be reversed or interposed, all without departing from the spirit or scope of the invention as defined in the appended claims.

What is claimed is:

1. A dispensing gun with an onboard accessory tool stowage system comprising:

a frame body including a handle housing and a cartridge frame portion defining a cartridge frame member, said cartridge frame portion extending from said handle housing and adapted to receive to receive a cartridge of work material therein, said frame body further including at least one retention structure releasably secured to and extending through a wall of said cartridge frame member for retention therewith, said at least one retention structure including a retention base having a plurality of fastening tangs and at least one receiving post integrally formed in one piece formation with said retention base and protruding from said frame body;

the plurality of fastening tangs having at least a pair of fastening tangs extending through said wall of said frame body, each of said pair of fastening tangs corresponding to said at least one receiving post for releasable engagement to an inner surface of said frame body;

at least one accessory tool having at least one receptacle formed within said at least one receptacle tool and configured for releasable securement to said at least one receiving post when stowed thereon, said at least one accessory tool being in at least partial releasable frictional engagement with said at least one receiving post for releasable securement of said at least one accessory tool to said frame body; and a drive mechanism operably coupled to said frame body, the drive mechanism including a drive member displaceable within the cartridge frame portion for forcing extrusion of work material from a cartridge of work material disposed in said cartridge frame portion.

2. The dispensing gun as recited in claim 1, wherein said at least one receptacle of said accessory tool is formed as a through slot configured to receive insert of said at least one receiving post therein for releasable engagement therewith.

3. The dispensing gun as recited in claim 2, wherein said dispensing gun includes a pair of accessory tools, said frame body includes a pair of retention structures, each of said pair of retention structures including at least one receiving post protruding from said frame body for releasable engagement with a respective one of said pair of accessory tools.

4. The dispensing gun as recited in claim 3, wherein a first of said pair of retention structures includes a single receiving post, and a first of said pair of accessory tools includes a single receptacle configured to receive insert and releasable engagement of said receiving post of said first retention structure therein.

5. The dispensing gun as recited in claim 4, wherein a second of said pair of retention structures includes a pair of receiving posts, and a second of said pair of accessory tools includes at least one receptacle configured to receive insert and releasable engagement of said pair of receiving posts of said second retention structure therein.

6. The dispensing gun as recited in claim 5, wherein said second accessory tool includes a pair of receptacles, each of said pair of receptacles being configured to respectively receive insert and releasable engagement of a corresponding one of said pair of receiving posts of said second retention structure therein.

7. The dispensing gun as recited in claim 1, wherein said at least one receiving post is disposed on said cartridge frame portion of said frame body.

8. The dispensing gun as recited in claim 1, wherein said at least one receiving post is disposed on said handle housing of said frame body.

9. The dispensing gun as recited in claim 3, wherein said pair of retention structures are respectively disposed on said cartridge frame portion of said frame body.

10. The dispensing gun as recited in claim 3, wherein one of said pair of retention structures is disposed on said cartridge frame portion of said frame body, and the other of said pair of retention structures is disposed on said handle housing of said frame body.

11. The dispensing gun as recited in claim 1, wherein said at least one retention structure includes said retention base having an outer facing surface from which said at least one receiving post extends outwardly and an opposing surface thereof configured for retentive engagement with said frame body.

12. The dispensing gun as recited in claim 11, wherein said opposing surface of said base has said plurality of fastening tangs extending therefrom for passage through at least one aperture formed in said frame body and retentive engagement with a corresponding surface of said frame body.

13. The dispensing gun as recited in claim 11, wherein at least a portion of said plurality of fastening tangs have a barb formed thereon to engage said corresponding surface of said frame body.

14. The dispensing gun as recited in claim 3, wherein each of said pair of retention structures is affixed to said frame body by discrete fastening members.

15. The dispensing gun as recited in claim 3, wherein each of said pair of retention structures is affixed to said frame body by integrally formed fastening tangs.

16. The dispensing gun as recited in claim 5, wherein each of said pair of receiving posts of said second retention structure includes a retention protuberance disposed adjacent a distal end thereof for reversable engagement with a corresponding surface of said second accessory tool.

17. A dispensing gun with an onboard accessory tool stowage system comprising:

a frame body including a handle housing and a cartridge frame portion, said cartridge frame portion extending from said handle housing and configured for receiving a cartridge of work material therein, said frame body further including a plurality of retention structures, each of said retention structures being releasably secured to and having a portion thereof extending through a wall of said frame body for retention to an interior facing surface of said frame body, each of said retention structures including a plurality of fastening tangs and at least one receiving post protruding from said frame body;

the plurality of fastening tangs having at least a pair of fastening tangs extending through said wall of said frame body, each of said pair of fastening tangs corresponding to said at least one receiving post for releasable engagement to an inner surface of said frame body;

a plurality of accessory tools, each of said plurality of accessory tools being configured for detachable and at least releasable securement to said at least one receiving post of a respective one of said plurality of retention structures when stowed thereon; and a drive mechanism operably coupled to said frame body, the drive mechanism including a drive member passing displaceably into the cartridge frame portion for forcing extrusion of work material from a cartridge of work material disposed in said cartridge frame portion.

18. The dispensing gun as recited in claim 17, wherein said plurality of accessory tools are each formed with at least one receptacle configured to receive insert of said at least one receiving post therein of said respective one of said plurality of retention structures for releasable engagement therewith.

19. The dispensing gun as recited in claim 18, wherein at least one of said plurality of retention structures includes a pair of receiving posts protruding from said frame body.

20. The dispensing gun as recited in claim 19, wherein at least one of said plurality of accessory tools includes at least one receptacle configured to receive insert and releasable engagement of said pair of receiving posts.

21. The dispensing gun as recited in claim 19, wherein at least one of said plurality of accessory tools includes a pair of receptacles, each of said pair of receptacles being configured to respectively receive insert of a corresponding one of said pair of receiving posts to provide detachable engagement of said at least one accessory tool therewith.

22. The dispensing gun as recited in claim 17, wherein said plurality of retention structures each include a base having an outer facing surface from which said at least one receiving post extends outwardly, said base being configured for retentive engagement with said frame body.

23. The dispensing gun as recited in claim 22, wherein at least one of said plurality of retention structures is affixed to said frame body by discrete fastening members.

24. The dispensing gun as recited in claim 17, wherein said plurality of retention structures each include a base having an outer facing surface from which said at least one receiving post extends outwardly, said base of at least one of said plurality of retention structures having said plurality of fastening tangs extending from an opposing surface thereof for passage through at least one aperture formed in said frame body for retentive engagement with a corresponding surface of said frame body.

25. The dispensing gun as recited in claim 24 wherein each of said plurality of fastening tangs has a barb formed thereon to engage said corresponding surface of said frame body.

26. A dispensing gun with an onboard tool stowage system comprising:

a frame body including a handle housing and a cartridge frame portion, said cartridge frame portion extending from said handle housing and configured for receiving a cartridge of work material therein, said frame body further including at least one retention structure having a portion thereof being releasably secured to said frame body on an interior surface of said frame portion, said at least one retention structure including a plurality of fastening tangs and at least one receiving post protruding from an exterior surface of said frame body;

the plurality of fastening tangs having at least a pair of fastening tangs extending through said wall of said frame body, each of said pair of fastening tangs corresponding to said at least one receiving post for releasable engagement to an inner surface of said frame body:

at least one accessory tool configured for detachable and at least releasable securement to said at least one receiving post when stowed thereon; and, a drive mechanism operably coupled to said frame body, the drive mechanism including a drive member passing displaceably into the cartridge frame portion for forcing extrusion of work material from a cartridge of work material disposed in said cartridge frame portion.

27. The dispensing gun as recited in claim 26, wherein said at least one retention structure includes a base having an outer facing surface from which said at least one receiving post extends outwardly, said base being configured for retentive engagement with said frame body.

28. The dispensing gun as recited in claim 27, wherein said base of said at least one retention structure is configured for fixation to said frame body by discrete fastening members.

29. The dispensing gun as recited in claim 27, wherein said base has said plurality of fastening tangs extending from an opposing surface thereof for passage through at least one aperture formed in said frame body for retentive engagement with a corresponding surface of said frame body.

30. The dispensing gun as recited in claim 29, wherein each of said plurality of fastening tangs has a barb formed thereon to engage said corresponding surface of said frame body.

31. The dispensing gun as recited in claim 26, wherein said at least one retention structure includes a pair of receiving posts protruding from said frame body.

32. The dispensing gun as recited in claim 26, wherein said at least one retention structure includes a base having an outer facing surface, and a pair of receiving posts extending outwardly from said base, at least one of said pair of receiving posts being elastically displaceable.

33. The dispensing gun as recited in claim 32, wherein said at least one accessory tool includes at least one receptacle configured to receive insert and releasable engagement of said pair of receiving posts, said at least one elastically displaceable receiving post being displaced during engagement and detachment of said accessory tool.

* * * * *